US010788047B2

United States Patent
Stephens

(10) Patent No.: US 10,788,047 B2
(45) Date of Patent: Sep. 29, 2020

(54) LOAD-BEARING MEMBERS FOR AIRCRAFT LIFT AND THRUST

(71) Applicant: AvionOne Innovations, LLC, Hurst, TX (US)

(72) Inventor: Thomas G. Stephens, Euless, TX (US)

(73) Assignee: AvionOne Innovations, LLC, Hurst, TX (US)

( * ) Notice: Subject to any disclaimer, the term of this patent is extended or adjusted under 35 U.S.C. 154(b) by 0 days.

(21) Appl. No.: 16/367,658

(22) Filed: Mar. 28, 2019

(65) Prior Publication Data

US 2019/0301486 A1    Oct. 3, 2019

Related U.S. Application Data

(60) Provisional application No. 62/649,899, filed on Mar. 29, 2018.

(51) Int. Cl.
*B64C 1/16* (2006.01)
*B64D 27/20* (2006.01)
*F04D 29/44* (2006.01)
*F04D 25/06* (2006.01)

(52) U.S. Cl.
CPC ............. *F04D 29/441* (2013.01); *B64C 1/16* (2013.01); *B64D 27/20* (2013.01); *F04D 25/06* (2013.01)

(58) Field of Classification Search
CPC ..... B64C 1/061; B64C 29/00; B64C 29/0016; B64C 29/0025; B64C 29/0041; B64C 29/005; B64C 29/0091; B64C 29/04
USPC ....................................................... 244/23 A
See application file for complete search history.

(56) References Cited

U.S. PATENT DOCUMENTS

| 2,932,468 | A |   | 4/1960  | Kappus   |             |
|-----------|---|---|---------|----------|-------------|
| 2,968,453 | A | * | 1/1961  | Bright   | B64C 29/0025 244/12.5 |
| 3,073,548 | A | * | 1/1963  | Marsh    | B64C 29/0066 244/12.5 |
| 3,107,071 | A |   | 10/1963 | Wessels  |             |
| 3,117,750 | A | * | 1/1964  | Snell    | F02K 1/004 244/23 D |
| 3,388,878 | A |   | 6/1968  | Peterson |             |
| 3,823,897 | A |   | 7/1974  | Bloomquist |           |

(Continued)

FOREIGN PATENT DOCUMENTS

| EP | 3401222 A1 * | 11/2018 | ............ B64C 1/12 |
| GB | 2469613 A  * | 10/2010 | ............ B64C 15/02 |

OTHER PUBLICATIONS

AvionOne Innovations, LLC; PCT/US20191024627 (filed Mar. 28, 2019); International Search Report (PCT/ISA/210) dated Jun. 28, 2019), 2 pp.

(Continued)

*Primary Examiner* — Christopher P Ellis
(74) *Attorney, Agent, or Firm* — Timothy G. Ackermann

(57) ABSTRACT

An aircraft includes an airframe, ducted fans, and ducts for carrying pressurized air for lift and thrust supplied by the fans. The ducts form part of the airframe and carry static and dynamic loads applied to the airframe. Ducting members supply lift and thrust and transmit them to other airframe components. The ducts also carry the ducted air to exits set distant from the fans to permit flight control of the aircraft. Ducting members also form airfoils creating lift for the aircraft.

28 Claims, 27 Drawing Sheets

(56) References Cited

U.S. PATENT DOCUMENTS

| | | | | |
|---|---|---|---|---|
| 3,830,451 | A * | 8/1974 | Fosness | B64C 29/0091 244/207 |
| 3,910,529 | A * | 10/1975 | Putnam | B64C 29/0025 244/12.3 |
| 3,972,490 | A * | 8/1976 | Zimmermann | B64C 29/0016 244/12.3 |
| 5,320,305 | A * | 6/1994 | Oatway | B64C 29/0025 244/12.3 |
| 5,897,078 | A * | 4/1999 | Burnham | B64C 1/0009 244/117 R |
| 6,547,180 | B1 * | 4/2003 | Cassidy | B64C 15/00 244/12.5 |
| 7,857,253 | B2 * | 12/2010 | Yoeli | B64C 1/1415 244/12.3 |
| 8,382,030 | B2 | 2/2013 | Kosheleff | |
| 8,960,592 | B1 * | 2/2015 | Windisch | A63H 30/04 244/12.5 |
| 9,096,314 | B2 | 8/2015 | Brotherton-Ratcliffe | |
| 2003/0183723 | A1 * | 10/2003 | Bevilaqua | B64C 29/0066 244/12.5 |
| 2007/0069066 | A1 * | 3/2007 | Lawson | B64C 9/18 244/12.1 |
| 2007/0252032 | A1 * | 11/2007 | Lawson | B64C 15/02 244/12.3 |
| 2010/0120273 | A1 * | 5/2010 | Lucero | H05K 1/02 439/79 |
| 2010/0294877 | A1 * | 11/2010 | Jianu | B64C 29/0025 244/2 |
| 2011/0049306 | A1 * | 3/2011 | Yoeli | B64C 29/0025 244/23 A |
| 2013/0112804 | A1 * | 5/2013 | Zhu | B64C 29/0025 244/2 |
| 2016/0368601 | A1 * | 12/2016 | Avery | B64C 29/0025 |
| 2017/0253343 | A1 * | 9/2017 | Hara | B64D 13/06 |
| 2019/0301486 | A1 * | 10/2019 | Stephens | B64C 1/16 |

OTHER PUBLICATIONS

AvionOne Innovations, LLC; PCT/US20191024627 (filed Mar. 28, 2019); Written Opinion of the International Search Authority (PCT/ISA/237) (dated Jun. 28, 2019), 8 pp.

Stefano Rivellini, Bladeless Drone: First Flight (published Oct. 14, 2018); https://www.youtube.com/watch?v=5L6FSdUmEpg (attached screencap of video page, at 2:25).

Stefano Rivellini, Bladeless Drone: First Flight (published Oct. 14, 2018); https://www.youtube.com/watch?v=5L6FSdUmEpg (attached screencap of video page, at 4:18).

* cited by examiner

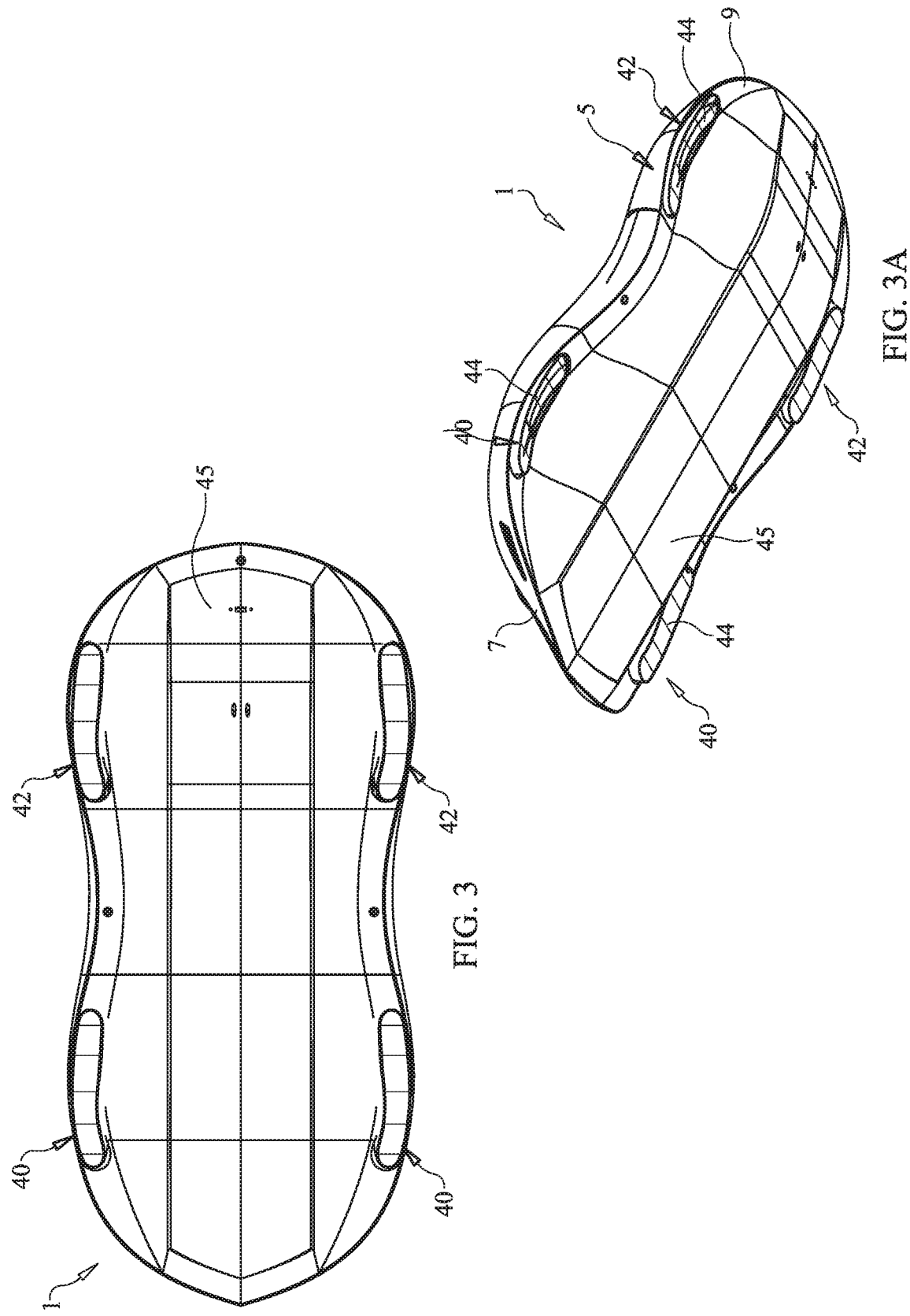

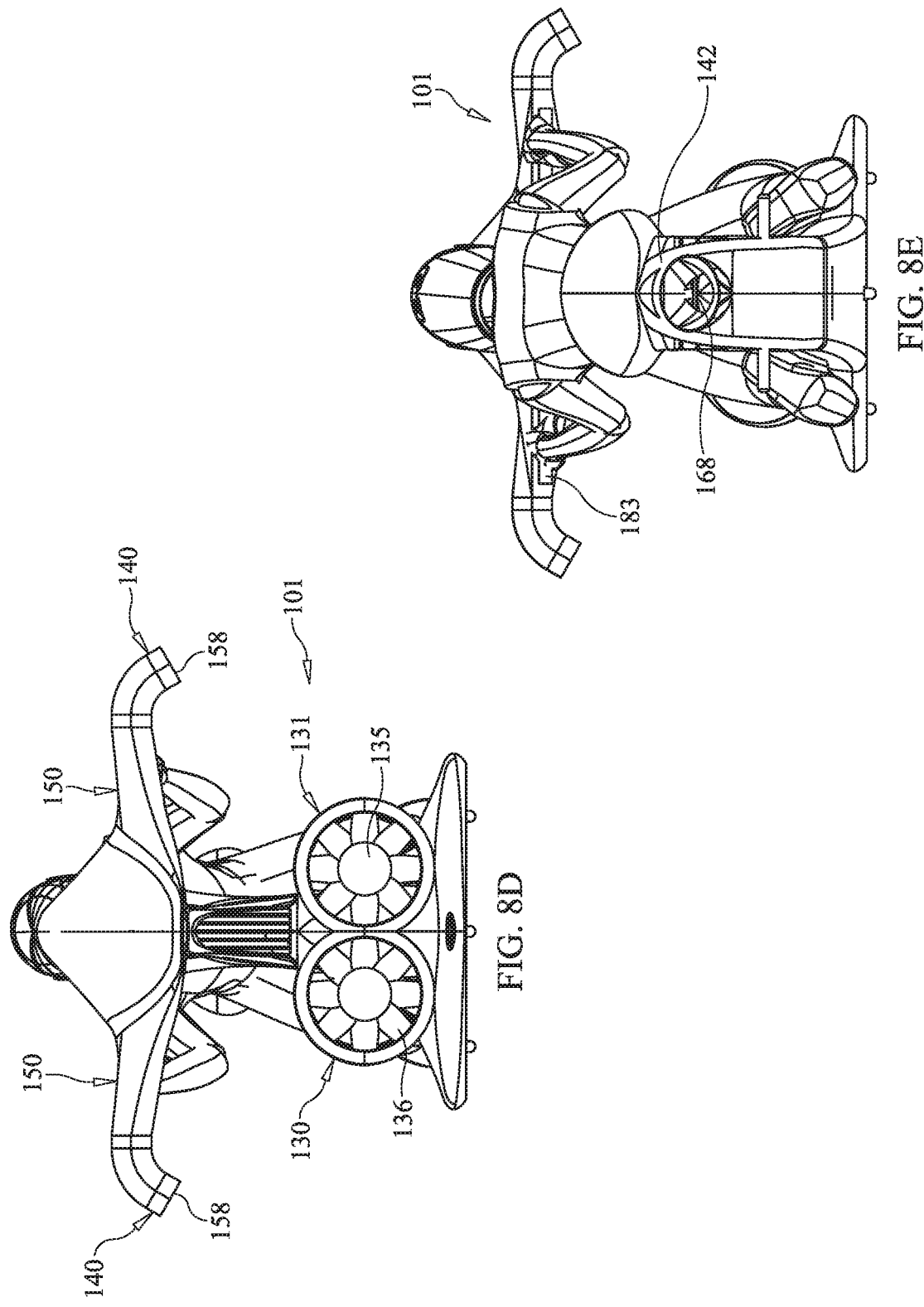

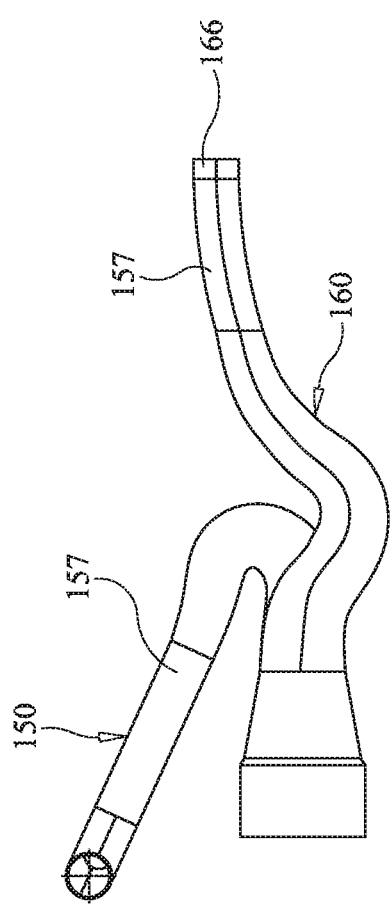
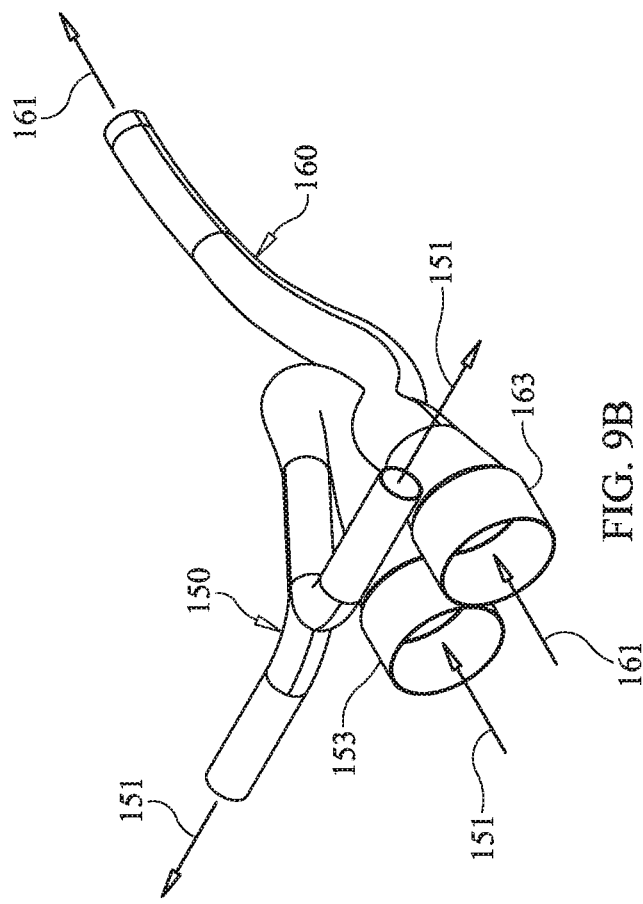
FIG. 9A
FIG. 9B

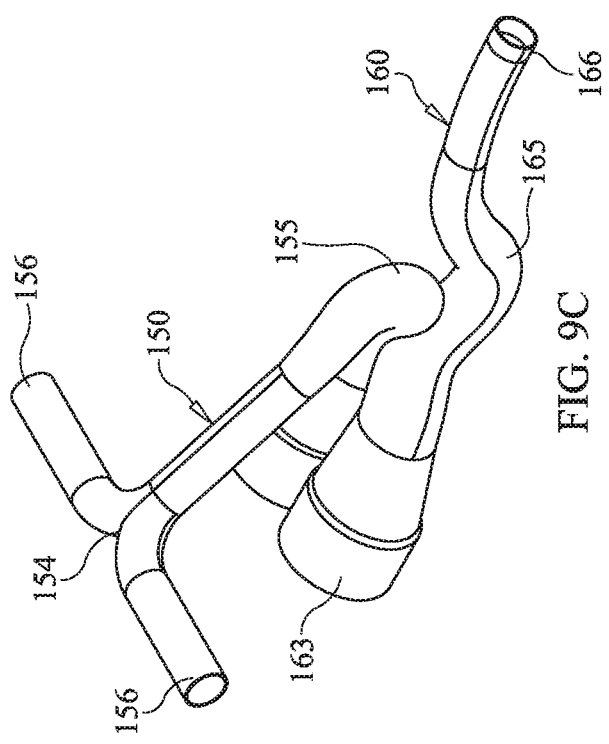
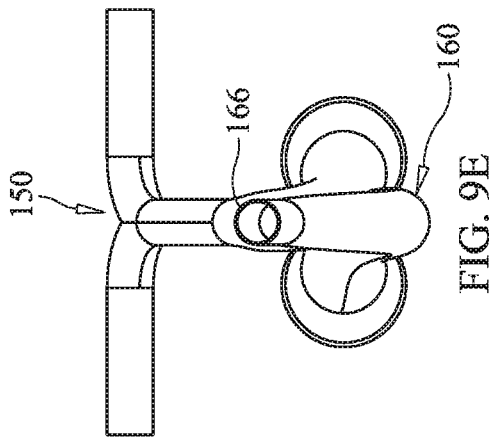
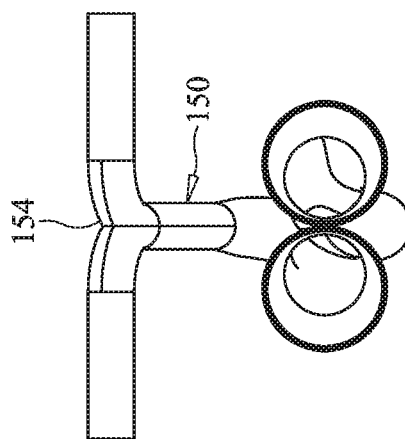
FIG. 9C
FIG. 9E
FIG. 9D

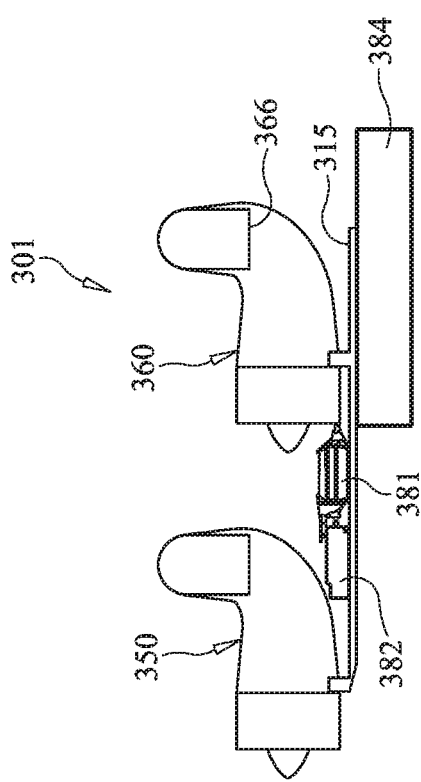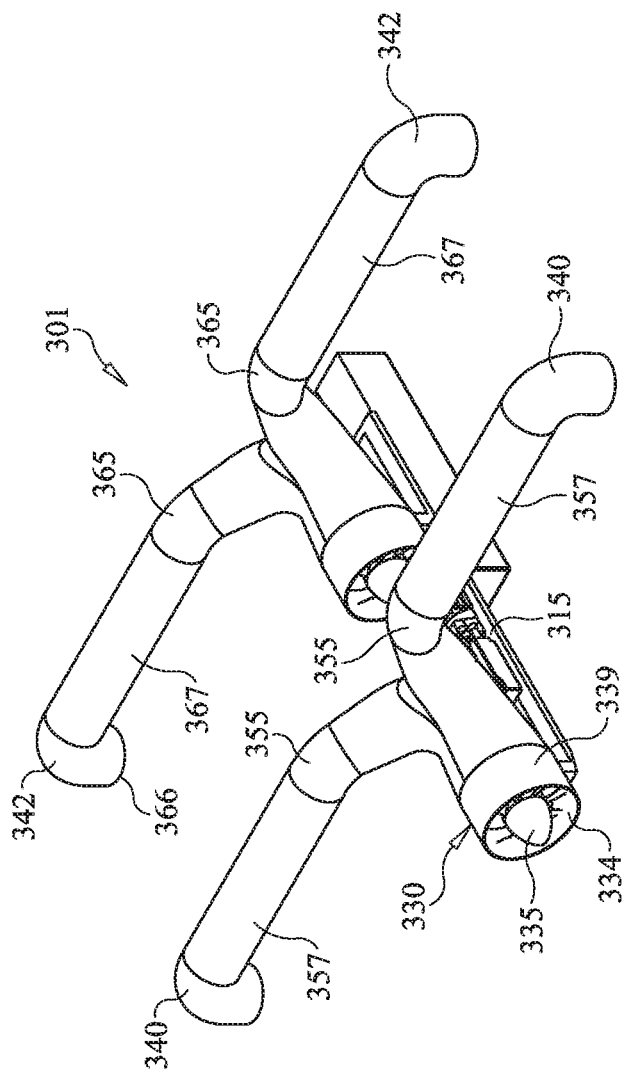

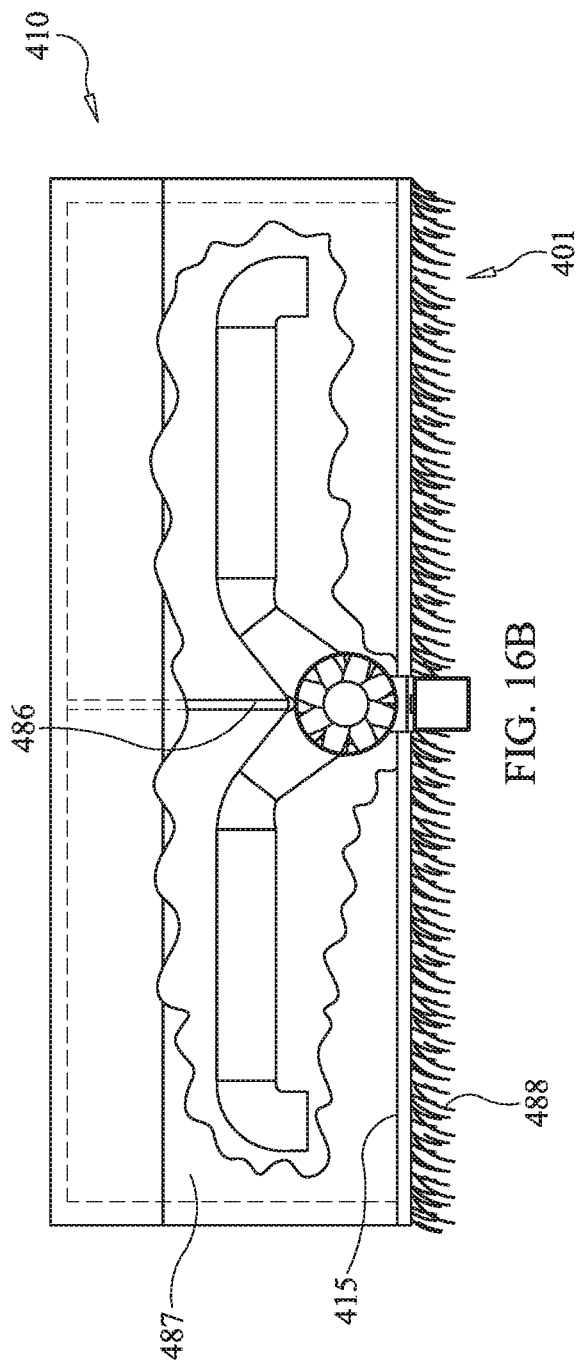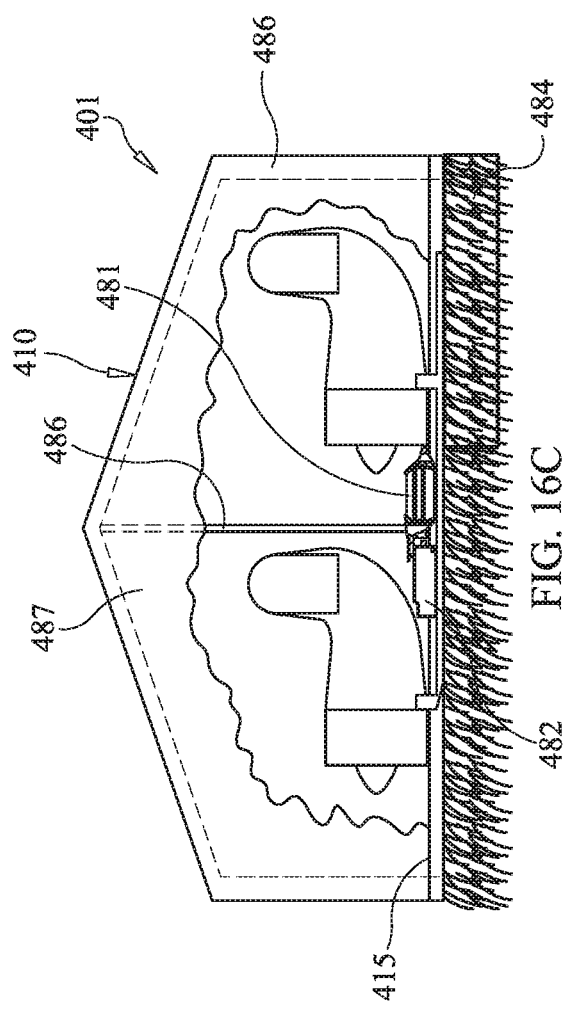

LOAD-BEARING MEMBERS FOR AIRCRAFT LIFT AND THRUST

TECHNICAL FIELD

The present invention relates generally to aircraft propulsion systems, particularly those relating to directing thrust, providing lift, and supporting load under static and dynamic conditions. More particularly, it relates to structures that contain or direct pressurized gasses, such as jet exhaust or ordinary pressurized air, as part of the airframe and to exit ports to create aircraft lift or thrust. It also relates to an aircraft in which some or all of the loadbearing airframe, such as wings, spars, airframe/chassis, or fuselage, contains or directs pressurized gasses for lift or thrust. It also relates to aircraft having lift and/or thrust provided by pressurized gasses exiting ducting through one or more exits, where the exits are physically spaced apart from the source of the pressurized gas and connected thereto by the ducting internal or external to the fuselage.

BACKGROUND OF THE INVENTION

Aircraft weight is a critical component of aircraft design specifications because the power-to-weight ratio (PWR) of its propulsion plant ultimately controls the aircraft's speed, lifting capability and flight envelope. Moreover, the aircraft's PWR is affected by how much fuel or other stored energy (e.g. battery power) it must carry to supply that power. Reduction of unnecessary weight in an aircraft is thus critical.

Aircraft require sources of thrust and lift. Fixed wing aircraft typically supply all or most of lift via airfoils, and thrust via a thrust source such as turboprop, turbofan, propeller, or the like. However, a single source of pressurized gasses may be supplied to meet requirements for both thrust and lift. Ducted fans may be used to provide pressurized air, e.g. for propulsion or lift, in an arrangement having a mechanical fan (or propeller-type arrangement) mounted within a cylindrical shroud or duct. Ducted fans take in gasses, typically air, and impart energy thereto via the fan blades, pressurizing and/or speeding up the gasses passing therethrough. Ducting the fan increases the efficiency of the fan over a standard propeller by reducing losses in thrust applied to the air at the blade tips. Increased efficiency in thrust-generation improves an aircraft's PWR. Extending ducting permits the gasses providing thrust or lift to be directed to most effectively and safely lift, or provide velocity to, the aircraft.

An aircraft's main body section, the fuselage, supports its propulsion and any lifting surfaces, as well and required control and stabilization surfaces, as well as holding those elements in the proper geometric relationships for aircraft stability and maneuverability. One such requirement is having the desired relationship between the center of thrust (CT) and the center of gravity (CG) to promote stability or maneuverability as desired. A fuselage may be a monocoque design in which its surface is also the primary load-bearing structure. One form of this is a sufficiently rigid expanded foam plastic as the core, perhaps including a fiberglass covering. Other examples include molded composite fuselages. A fuselage may also be a semi-monocoque design, in which a series of frames are formed in the desired shape of the fuselage (in a cross-sectional orientation), joined with lightweight longitudinal elements (stringers), which are then covered with a skin—typically of sheet aluminum—joined thereto. In either case, such monocoque and semi-monocoque fuselages may be described as "stressed skin" structures. The skin itself carries all or a portion of the external load of the aircraft (such as lifting surfaces, propulsion equipment) and internal load (propulsion equipment, flight controls, fuel, crew, cargo) but, in the case of the semi-monocoque design, is supported by the frames and stringers. An aircraft may also include a chassis-like structure onto which such external loads are supported and are fixed, and which supports a fuselage, which may be non-loadbearing.

Further, encasing fans and/or propeller blades improves safety for both the aircraft, passengers, and flight-line personnel, but omitting exposed rotating machinery, such as helicopter main blades/tail blades and turboprop propellers.

SUMMARY OF THE INVENTION

In accordance with an embodiment of the invention, an aircraft includes one or more power sources powering one more pressurized air sources. Each pressurized air source is associated with an air inlet reaching the aircraft's exterior, supplying air to an intake of the pressurized air source. Each pressurized air source, on its output side is associated with at least one outlet to the exterior of the aircraft for providing lift and/or thrust. Ducting connects the air source output to the outlet. The ducting forms some loadbearing portion of the aircraft, in which it supports static and dynamic loads applied to the airframe, in addition to internal loads resulting from pressurized gas transmission. Ducting may form part of the airframe, of the fuselage, such as a monocoque, parts of the fuselage, one or more wings or other airfoil or lifting surfaces, all or part of a chassis for the aircraft, or a backbone of the chassis or fuselage. Gas exits may be physically spaced well apart from the pressurized gas source, including by all or substantially the length of a wing or other airfoil, by a substantial fraction (such as ¼, ⅓, ½), or as long as, or more, of the length or width of the airframe or fuselage, with the ducting connecting the gas source to the exits. That distance may also be measured pathwise along the ducting.

In accordance with embodiments of the invention, variations on the air flowpaths exist. A single air inlet may supply a single pressurized air source, which supplies a single outlet, or may be split between two or more outlets. Similarly, a single air inlet may supply two or more pressurized air sources, each of which supplies a single outlet, or which are ganged up to supply fewer outlets than there are air sources, such as two-five into one, or two each into two.

In accordance with embodiments of the invention, a fuselage may itself form one or more airflow passages for transmitting and/or directing pressurized gasses. Airflow passages in the form of ducts may be created in a fuselage body, or that fuselage body formed around those passages, such as by 3D-printing or other additive manufacturing processes. In this fashion, the channels in the fuselage that carry airflow are themselves part of the fuselage and the structure surrounding those channels are loadbearing as a part of the fuselage. In accordance with embodiments of the invention, the fuselage is formed exclusively, solely, of substantially, of ducting in the form of the airflow passages defined by the surrounding supporting material. In accordance with embodiments of the invention, the ducting is integral to, or integrally formed in or of, the fuselage. A fuselage having integral ducting may be plastic, metal, a foamed material, expanded foam. In accordance with embodiments of the invention, the ducting may be formed substantially or entirely of sufficiently rigid tubing that can support its own weight and that of the aircraft. Rigid tubing may be plastic or metal. Ducting and tubing may be extruded or otherwise formed, such as by 3D-printing or other additive manufacturing processes, and may be formed in parts and joined, permanently or reversibly, such as by adhesives, welding, bolts, screws, and the like.

In accordance with an embodiment of the invention, an aircraft includes port and starboard forward pressurized air sources, and port and starboard rear pressurized air sources. A battery power supply powers the four independently controllable pressurized air sources, each of which is an electric ducted fan (EDF). A forward air inlet permits air to reach a forward shared plenum chamber supplying air to the inlets of the forward EDF units. Port and starboard rear inlets permit air to reach a rear plenum chamber supplying air to the inlets of the rear EDF units. Power supply, EDF units, flight controls, telecommunications gear (e.g. RC controls) are set into and supported by a lower fuselage section, and are set substantially low therein to create a low CG. Cavities are formed by the lower fuselage to create the lower part of the plenum chambers. Ducting from the outlet side of the EDF units extends upward, forming the body of the lower fuselage. Matching cavities are formed by the upper fuselage section to create the upper part of the plenum chambers. Matching ducting extends upwardly and outboard, and then turns downwardly to connect to the outlets on the exterior of the aircraft, forming the body of the upper fuselage. That ducting connects to the lower fuselage ducting from the outlet side of the EDF units. The outlets face downwards and include directing surfaces, such as controllable vanes, to control whether the pressurized air therethrough is lift or a combination of lift and thrust. Suitable flight controls are provided for a pilot (remote or onboard) to control and direct motion of the aircraft from upward, upward and forward, or forward, or even rearward by adjusting one or more of the vanes from down to slanted, creating varying thrust in individual EDFs, and by simultaneously controlling the EDF output to maintain a stable flight attitude. Likewise, varying vane positions, or varying thrust can be used to induce/control pitch, yaw, and roll of the aircraft. The four outlets are set around the periphery of the vehicle, one each port and starboard forward and rear. The upper fuselage formed by the upper ducting is wider at the outlets such that the outlets face downward unobstructed by the lower fuselage. The upwardly reach of the ducting permits the outlets, even after the final downwardly turn of the ducting, to be higher than the CG, thus resulting in a CT above the CG.

In accordance with an embodiment of the invention, an aircraft in a motorcycle-like configuration includes port and starboard independently controllable pressurized air sources. A battery power supply powers the two pressurized air sources, each of which is an electric ducted fan (EDF). The inlets of the EDF units face forward and are open to the air. The outlet side of the EDF units are connected to load-bearing ducting sections. A first section connects to the port EDF, and extends substantially rearwardly with an upward arc, then continues rearwardly to the rear of the aircraft. The exit of the first section is connected to a gimballed thrust control, that is a controllable vectoring device that permits the pressurized air to be adjusted between lift, thrust, and a combination thereof. A second section connects to the starboard EDF and extends rearwardly then bends upwardly and forwardly to end above and even forward of the inlet of the EDF. The second section then splits into port and starboard sections, which extend outboard and then connect to downward-facing outlets. The ducting sections support the weight of the EDFs, batteries, flight controls, rider, fairing, and any cargo. In particular, the forward port and starboard sections extend outwardly without external support but themselves support fairings, while the section extending rearwardly supports the seat and pilot (above) and battery (below). The upwardly reach of the forward and rear ducting permits the forward port and starboard outlets, and the rear outlet, even after the final downwardly turn of the ducting or gimballed thrust control, to be higher than the CG, thus resulting in a CT above the CG. Suitable flight controls are provided for a pilot to control and direct motion of the aircraft from upward, upward and forward, or forward, or even rearward by adjusting the gimballed thrust control to create varying amounts of lift/thrust, and by simultaneously controlling the respective EDF output to maintain a stable flight attitude. Likewise, varying the thrust control in combination with the forward and rear EDF output can be used to induce/control pitch, yaw, and roll of the aircraft.

In accordance with an embodiment of the invention, an aircraft includes three longitudinally in-line independently controllable pressurized air sources and a set of forward and rear wings. A battery power supply powers the three pressurized air sources, each of which is an electric ducted fan (EDF). The inlet of the forward EDF unit faces forward and is open to the air. The outlet side of the forward EDF units is connected to load-bearing ducting extending to the forward wings. That forward ducting first connects to the forward EDF and extends rearwardly and upwardly to direct the airflow substantially upwardly, and to a point higher than the EDFs and the intake end of the ducting. Simultaneously, it lengthens longitudinally to extend substantially the longitudinal length of the forward wings. That ducting then splits port and starboard, forming forward wing roots. Then, it extends substantially laterally to both sides as the forward wings, its exterior cross section forming an airfoil shape. At the wing ends, the ducting turns substantially downward with an upward arc, then connects to downward-facing outlets on each forward wingtip. The inlet of the middle EDF unit faces forward is and is connected via a plenum to port and starboard inlets extending laterally therefrom to permit air to reach that EDF inlet. The outlet side of the middle EDF unit is connected to load-bearing ducting extending to the rear wings. That middle ducting first connects to the middle EDF, and extends rearwardly and upwardly, in a narrowing duct, to a point higher than the EDFs and the intake end of the ducting, and then again turning to direct the airflow substantially rearwardly, remaining above the rear EDF. The ducting then splits port and starboard, forming wing roots extending longitudinally to substantially the longitudinal length of the rear wings. Then, it extends substantially laterally to both sides as the rear wings, its exterior cross section forming an airfoil shape. At the wing ends, the ducting turns substantially downward with an upward arc, then connects to downward-facing outlets on each rear wingtip. Further supplied are upward-extending winglets, near the rear wingtips, to improve the wings' lift efficiency. The inlet of the rear EDF unit faces forward is and is connected via a plenum to port and starboard inlets extending laterally therefrom to permit air to reach that EDF inlet. The outlet side of the rear EDF unit is connected to load-bearing ducting extending rearwardly for a short distance. That rear ducting is supplied with exits formed by port and starboard side-mounted rotatable thrust controls. Those thrust controls permit the exiting thrust to be turned downwardly, rearwardly, or some combination thereof to supply lift, thrust, and a combination thereof, and permitting the creation of pitch of the aircraft. Further, the port and starboard thrust controls can be operated independently from each other, such that port lift/thrust unmatched to starboard lift/thrust can be used to induce yaw and/or roll of the aircraft. The ducting sections support the weight of the EDFs, batteries, flight controls, and any cargo. In particular, the forward and rear ducting each extend outwardly without external support as wings. The upwardly reach of the forward and middle ducting permits the forward and rear wingtip outlets, even after the final downwardly turn of the ducting, to be higher than the CG, thus resulting in a CT above the CG. Suitable flight controls are provided for a pilot (including a remote pilot) to control and direct motion of the aircraft by adjusting the thrust controls to create varying amounts of lift/thrust, and by simultaneously controlling the respective EDF output to maintain a stable flight attitude. Likewise, varying the thrust controls in combination with the forward and rear EDF output can be used to induce/control pitch, yaw, and roll of the aircraft.

Embodiments of the invention include flight control systems, controllable by an onboard or remote pilot. Control systems may include systems that maintain stable flight attitude, prevent or minimize roll or yaw or pitch, except when specifically indicated, that convert XYZ-coordinate input for the aircraft as a whole (e.g. rise, drop, turn to port and translate, or fly forward and dive) into actions by controllable elements on the aircraft to execute those actions (e.g. set port vanes to combination lift/forward thrust and increase port EDF output, or turn rear thrust control to full down and match forward/rear EDF outputs), or that permit direct control of flight control elements (e.g. pressurized air output, controlled vanes, or gimbaled thrust controls).

Embodiments of the invention include various sources of pressurized gasses for thrust and/or lift. A turbojet design will create a large volume of pressurized gasses, in the form of exhaust. A turbojet supplies its own power, requiring a liquid or gaseous, and typically hydrocarbon-based, fuel supply. A ducted fan design also creates a large volume of pressurized gasses, in the form of ordinary air. A ducted fan must be supplied with power. Various options exist, such as an electric motor, gas turbines, internal combustion engines. An electric motor version is an EDF. An EDF may be supplied with power via such options as batteries, fuel cells, or turbine generator, microturbines, or a combination thereof. A microturbine is a very small turbine creating pressurized exhaust gasses to drive an electric generator. In the case of a microturbine, a fuel supply is required. In the case of an EDF powered by a turbine generator or microturbine, the latter could be placed downstream of the EDF, in the ducting, thus permitting the pressurized air from the EDF to cool the generator/microturbine and adding the latter's exhaust gasses to the flow of pressurized gasses.

Embodiments of the present invention can may carry cargo or other loads beyond the aircraft's own. Such loads can include mail or packages for delivery, passengers, luggage, cameras or other sensing equipment, advertising, displays, stage props, floats, and characters.

This application further expressly incorporates herein the disclosure of U.S. Patent Appl. Ser. No. 62/649,899 and claims the benefit of priority therefrom.

Embodiments of the present invention further include: aircraft with a monocoque or semi-monocoque fuselage comprising ducting for lift and/or thrust; aircraft with a chassis structure comprising ducting for lift and/or thrust; load-bearing members that duct pressurized air for lift and/or thrust; load-bearing members that duct pressurized air where the cross-sectional shape of the member is substantially the same as the cross-section of the air flow therethrough; ducting that carries pressurized air for lift and/or thrust and forming load-bearing exterior structure, chassis, fuselage, an airfoil or a spar; aircraft with an airfoil, a spar, a fuselage, or a chassis, that ducts pressurized air for lift and/or thrust; aircraft structure that ducts pressurized air for lift and/or thrust and having thrust vectoring at the duct exit or of the duct exit; aircraft structure that ducts pressurized air for lift and/or thrust and having thrust vectoring such as movable vanes, rotatable ducting, or a gimbaled exit; and aircraft having lift provided by pressurized air exiting ducting through multiple exits, where the exits are physically spaced apart from the source of the pressurized air and connected thereto by the ducting.

BRIEF DESCRIPTION OF THE DRAWINGS

FIG. 3 illustrates a bottom view of an aircraft, in accordance with an embodiment of the present invention;

FIG. 3A illustrates a bottom left isometric view of an aircraft, in accordance with an embodiment of the present invention;

FIGS. 8A-8E illustrate, respectively, side, top and bottom isometric, front, and rear views, of an aircraft and rider, in accordance with an embodiment of the present invention;

FIGS. 9A-9E illustrate, respectively, side, top front and top rear isometric, front, and rear views, of ducting of the aircraft of FIGS. 8A-8E, in accordance with an embodiment of the present invention;

FIGS. 15A-15D illustrate, respectively, top, front, side, and isometric views, of an aircraft, in accordance with an embodiment of the present invention; and FIGS. 16A-16C illustrate, respectively, partial cutaway top, front, and side views of an aircraft, in accordance with an embodiment of the present invention.

DETAILED DESCRIPTION

Figure 1:
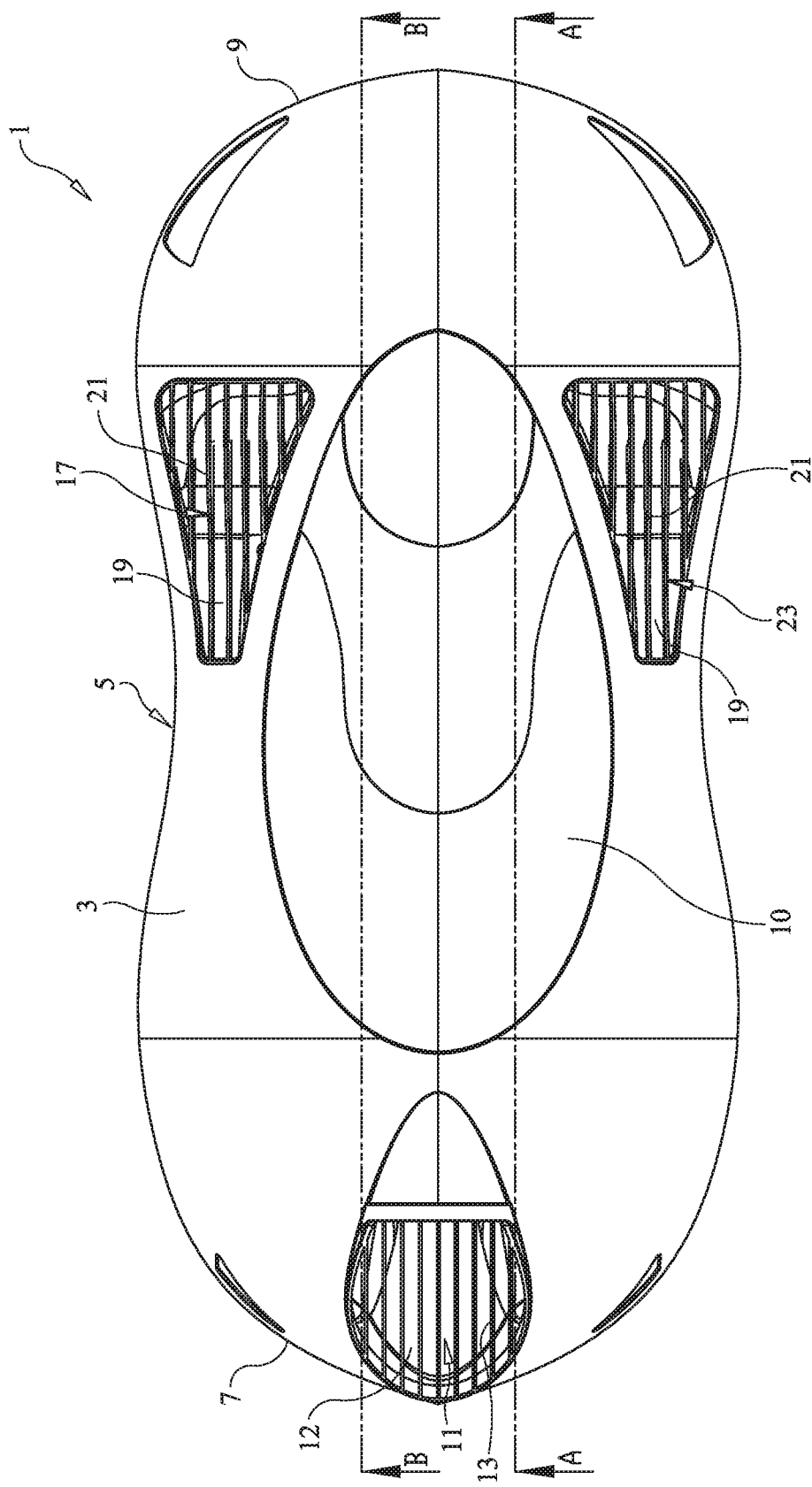
FIG. 1 illustrates a top view of an aircraft, depicting section lines A-A and B-B, in accordance with an embodiment of the present invention.

An embodiment of the invention is illustrated in FIGS. 1-7B. In accordance with one embodiment, aircraft 1 includes fuselage 5, formed in part of forward ducts 50 and rear ducts 60, having forward end 7 and rear end 9, and roof 10. As shown in exploded form (FIG. 6) and separated (FIGS. 7A, 7B) and in section (FIGS. 2A, 2B), fuselage 5 includes upper body 3, with lower face 2, and lower body 4, with upper face 6. Lower body 4 has a flattened base 45 suitable for landing. Bodies 3, 4 may be formed of a foam to save weight. Fuselage 5 may be covered (not shown) with a hardened or tough exterior layer.

Figure 2A:
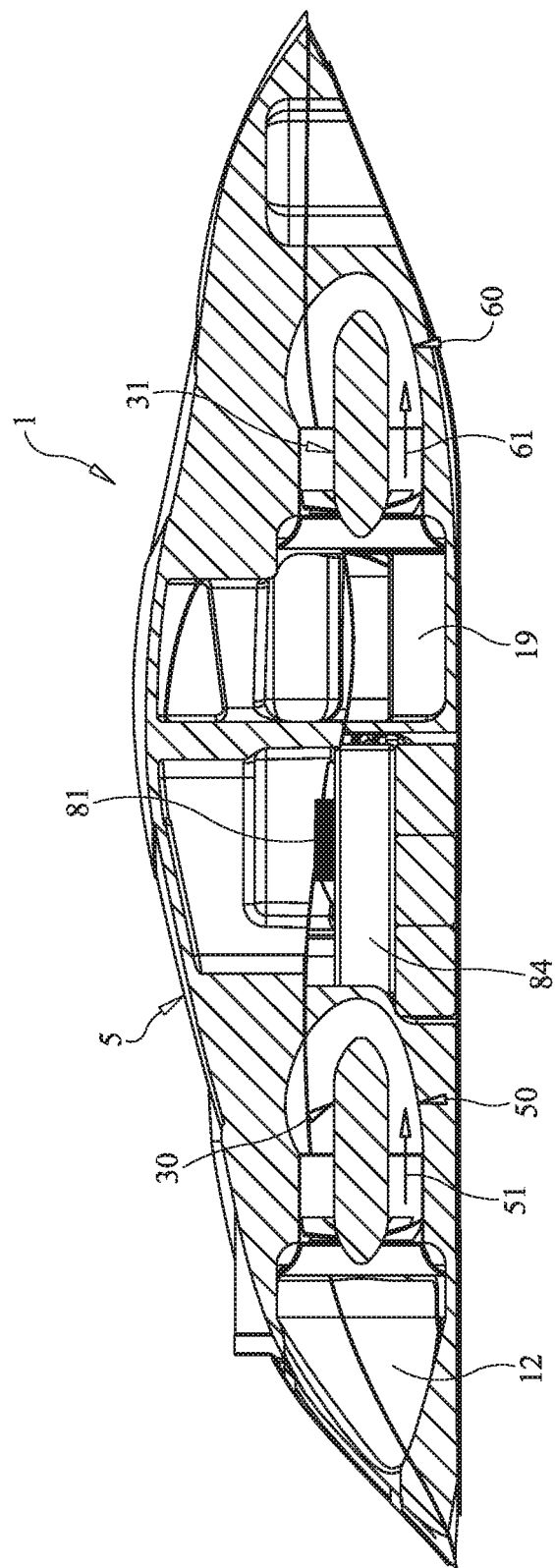
FIGS. 2A & 2B illustrate cross sections of an aircraft, along section lines A-A and B-B, in accordance with an embodiment of the present invention.
Figure 2B:
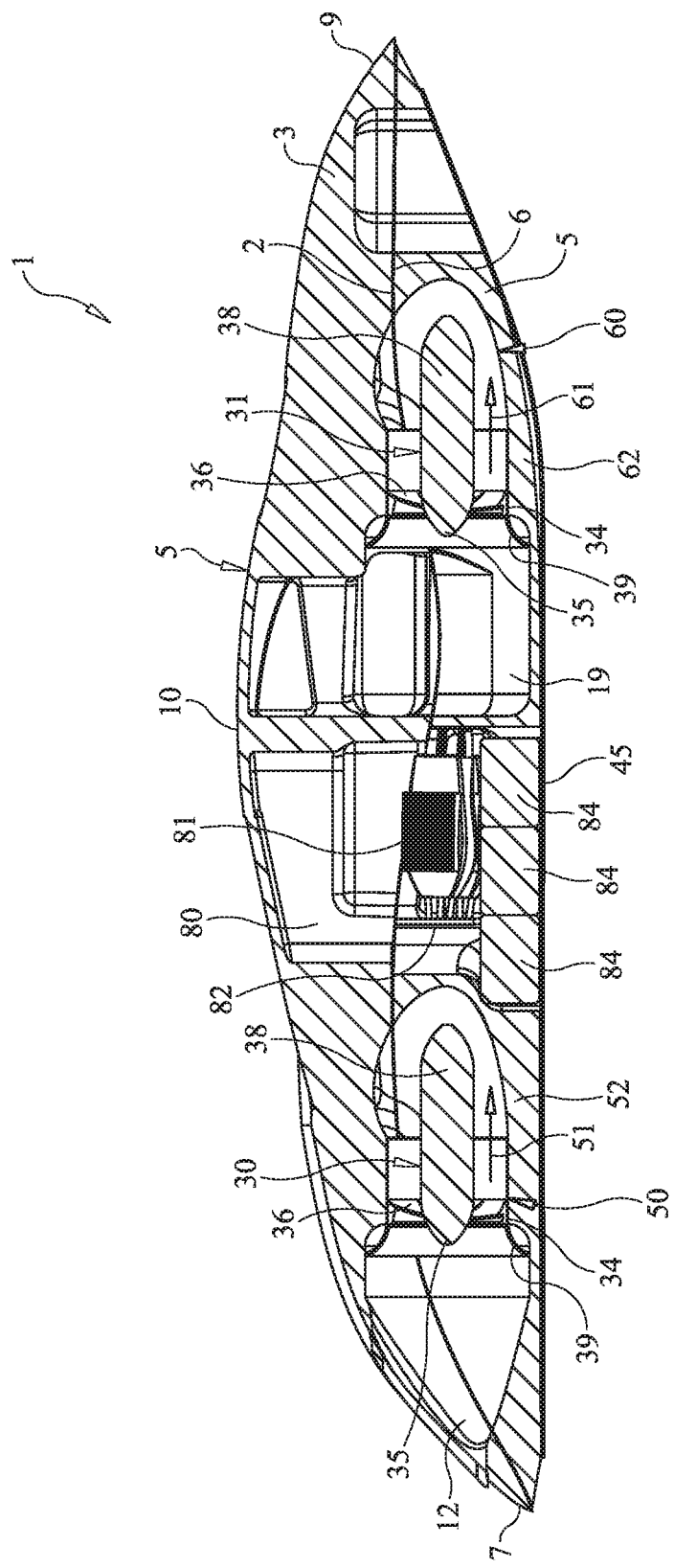
Figure 4:
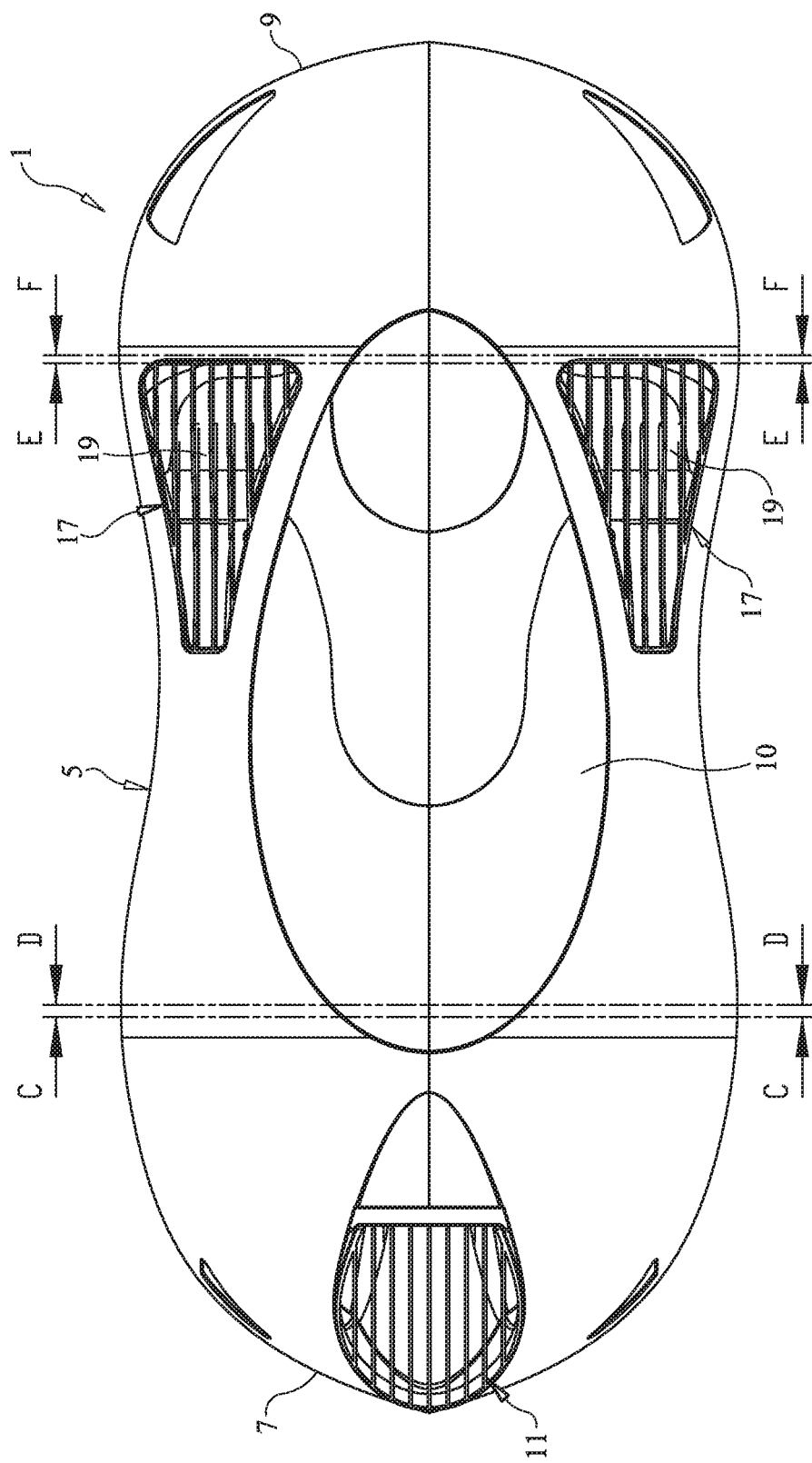
FIG. 4 illustrates a top view of an aircraft, depicting section lines C-C, D-D, E-E, and F-F, in accordance with an embodiment of the present invention.
Figure 5A:
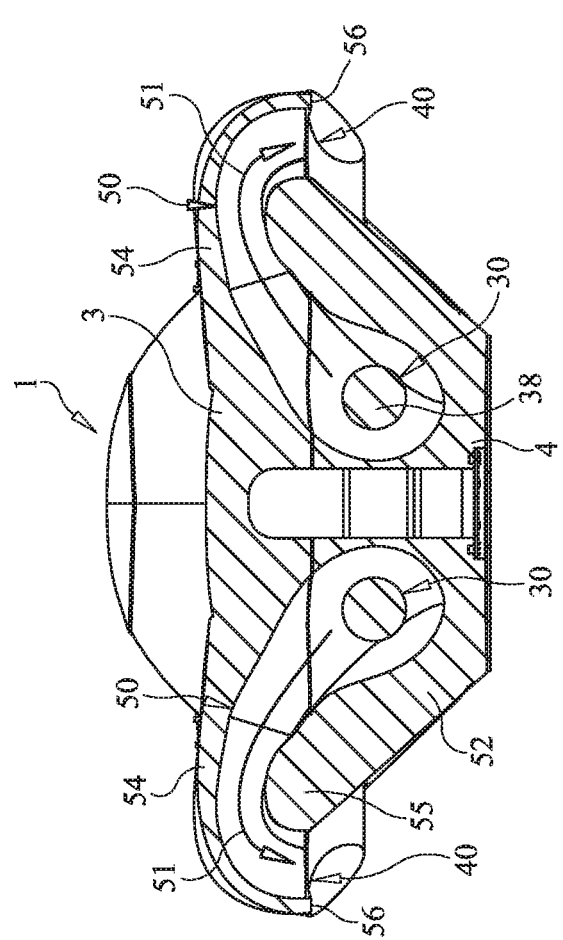
FIGS. 5A-5D illustrate cross sections of an aircraft, along section lines C-C, D-D, E-E, and F-F, in accordance with an embodiment of the present invention.
Figure 5B:
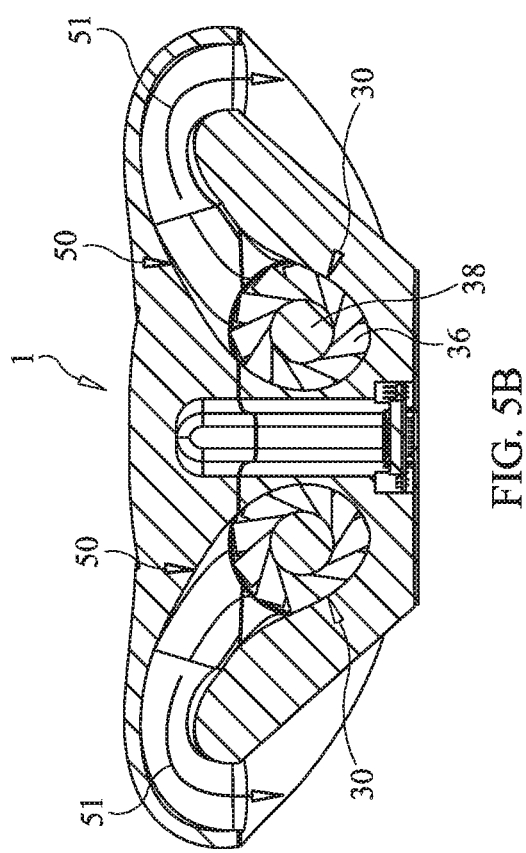
Figure 5C:
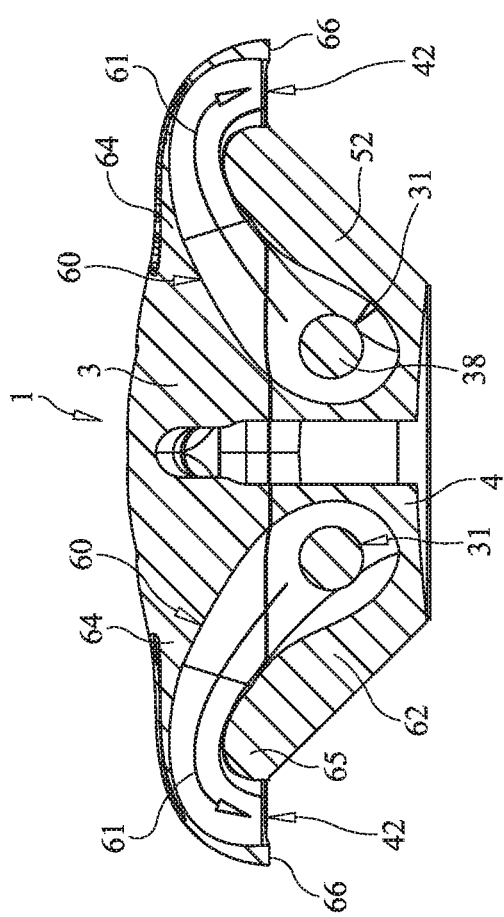
Figure 5D:
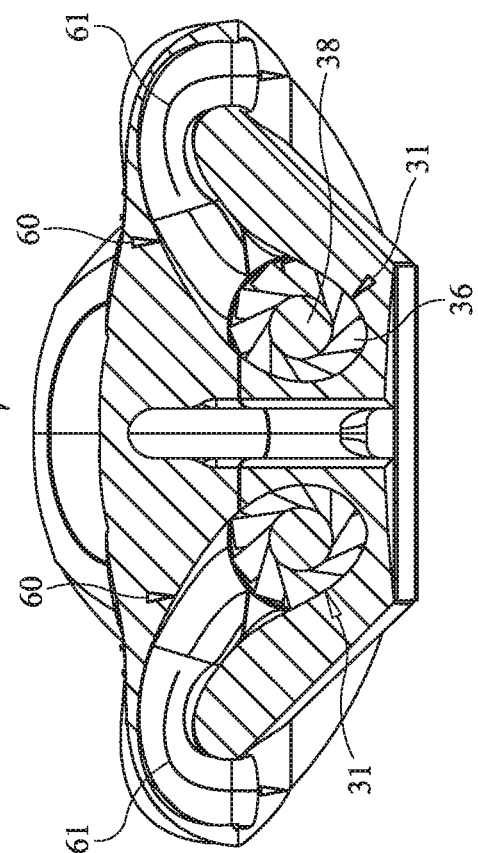
Figure 6:
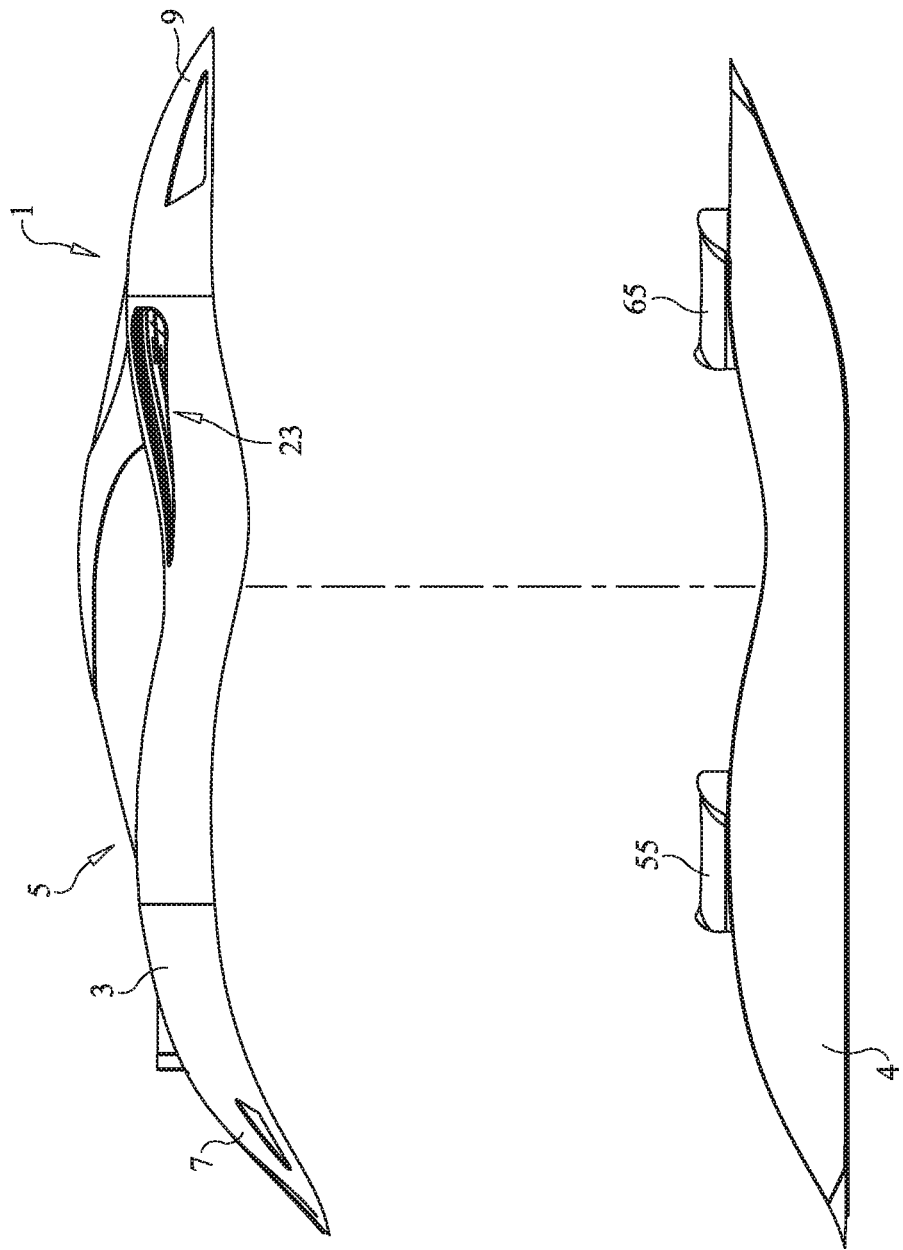
FIG. 6 illustrates a partially exploded side view of an aircraft, in accordance with an embodiment of the present invention.
Figure 7A:
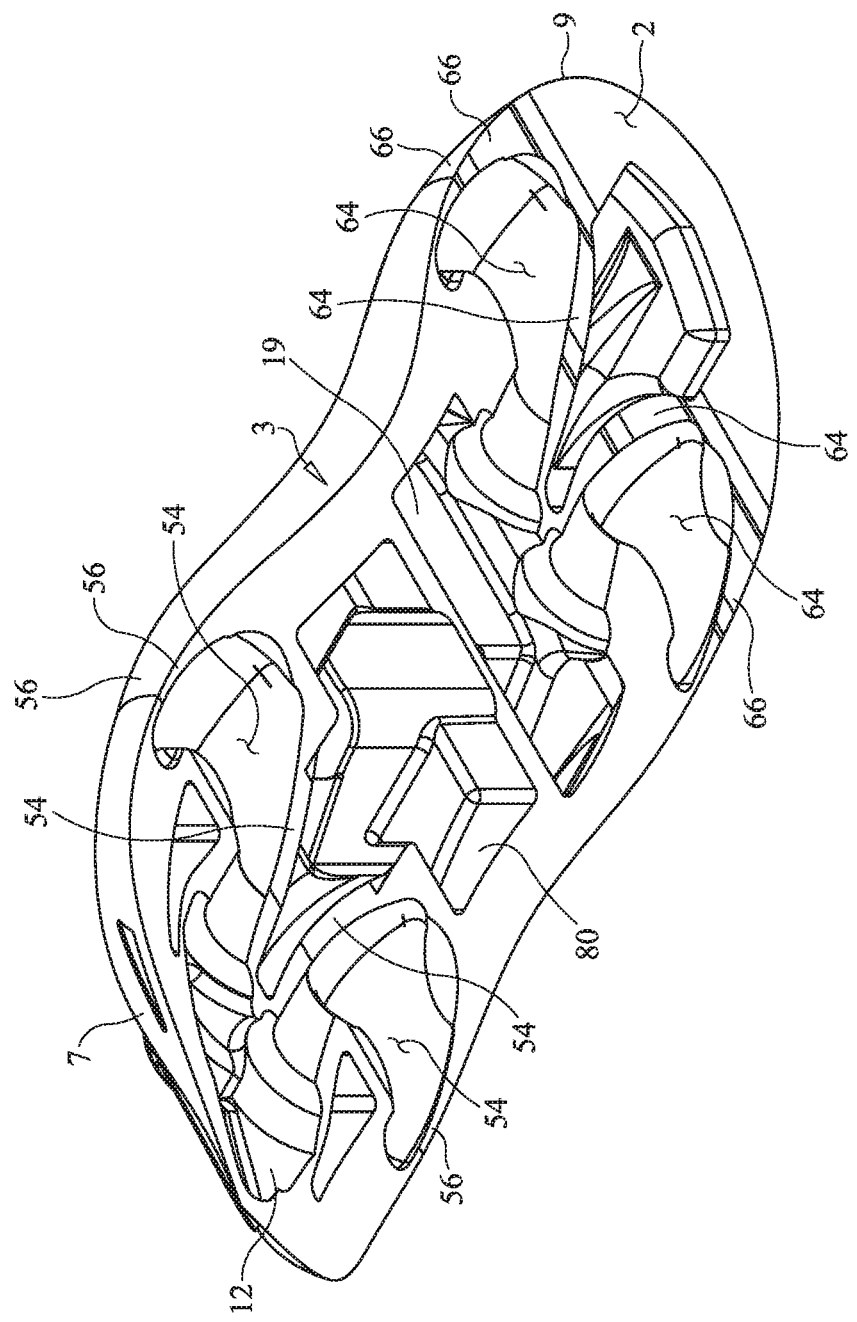
FIGS. 7A & 7B illustrate different isometric views of the exploded parts of FIG. 6, in accordance with an embodiment of the present invention.
Figure 7B:
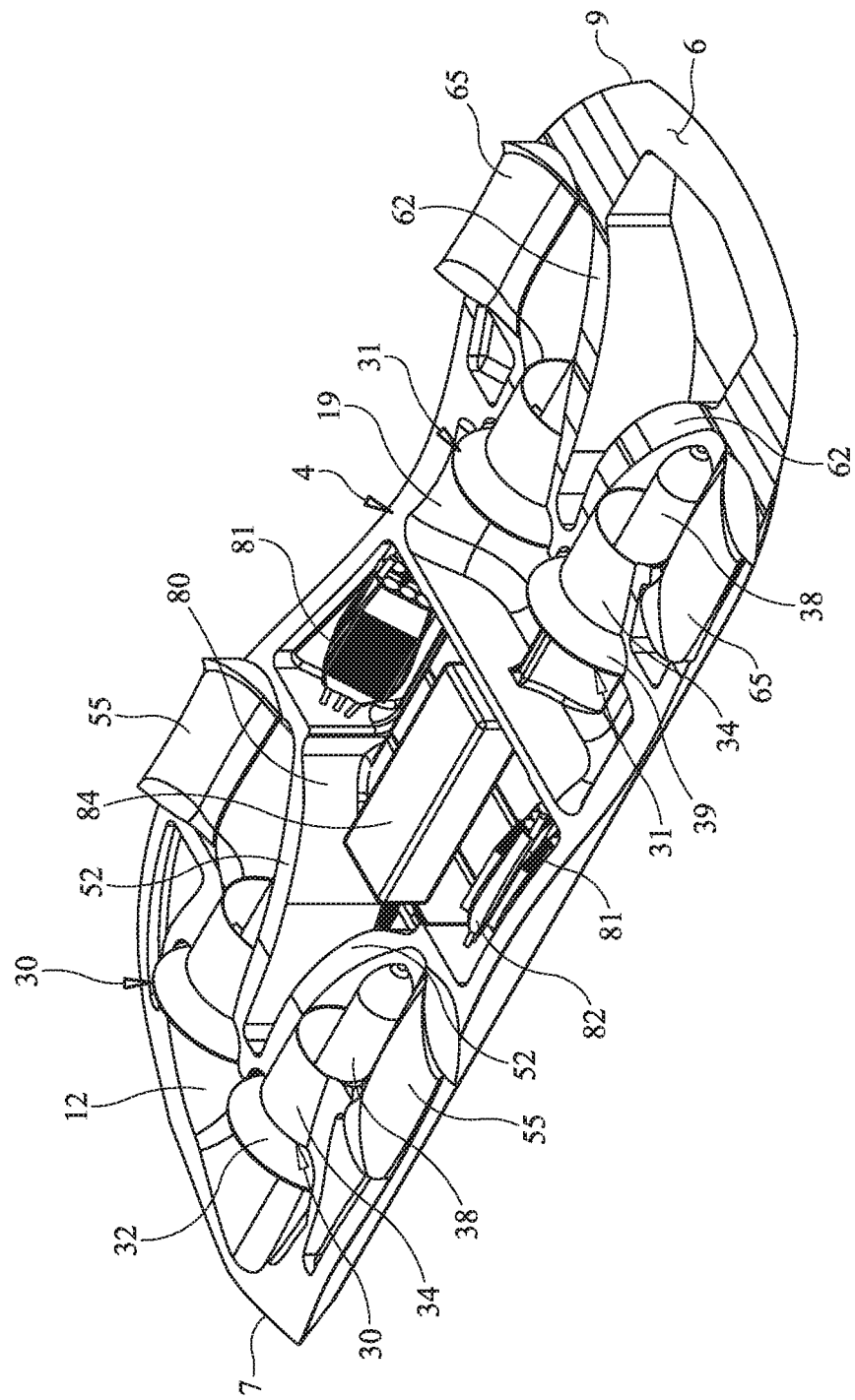
Figure 8A:
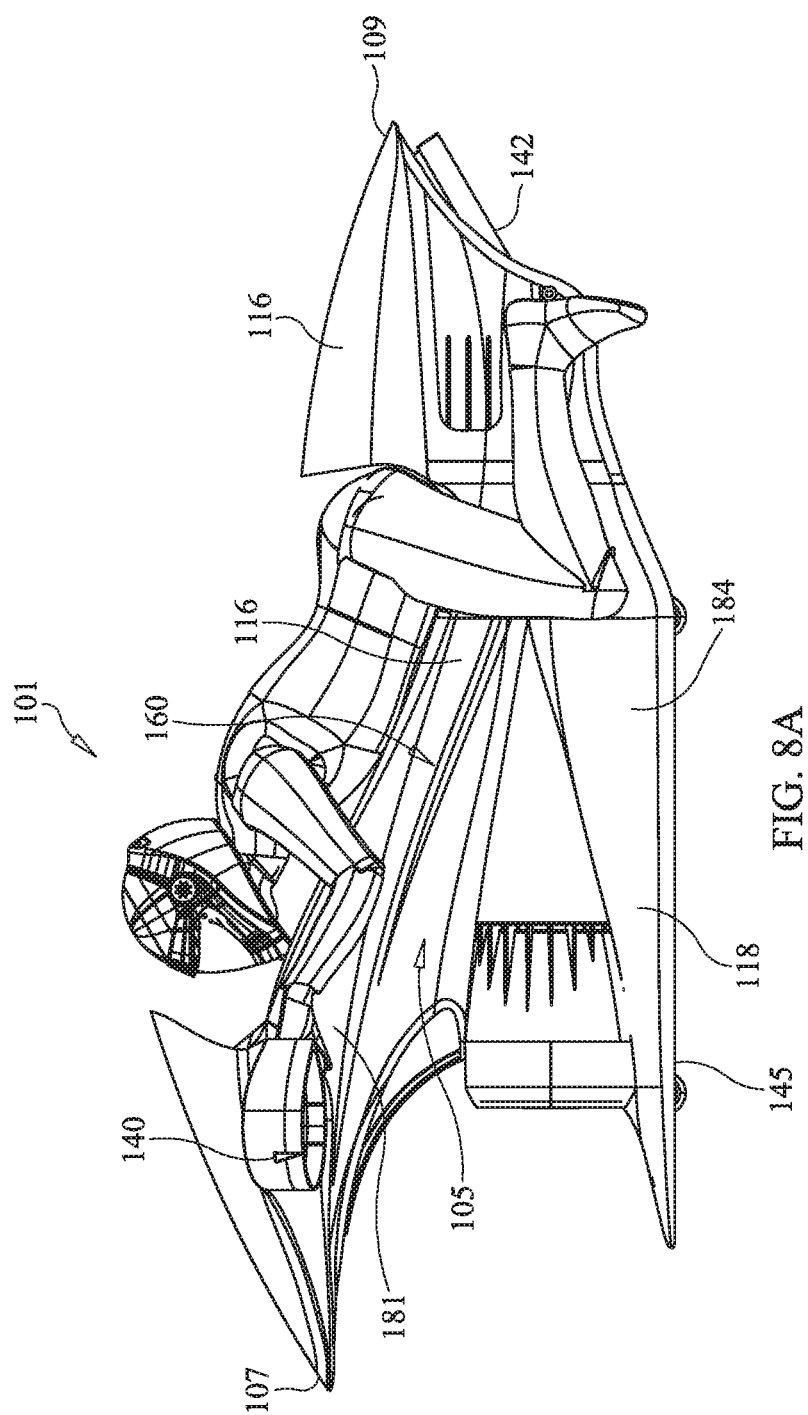
Figure 8B:
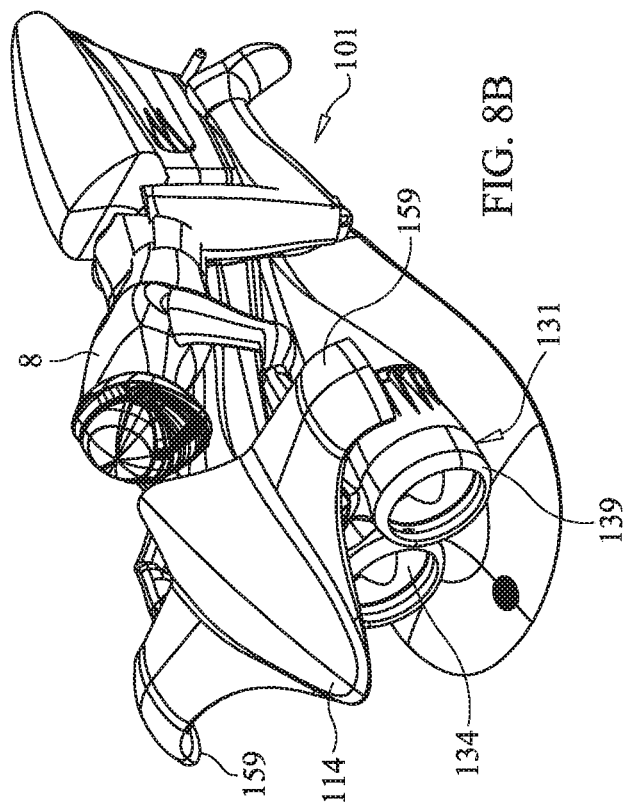
Figure 8C:
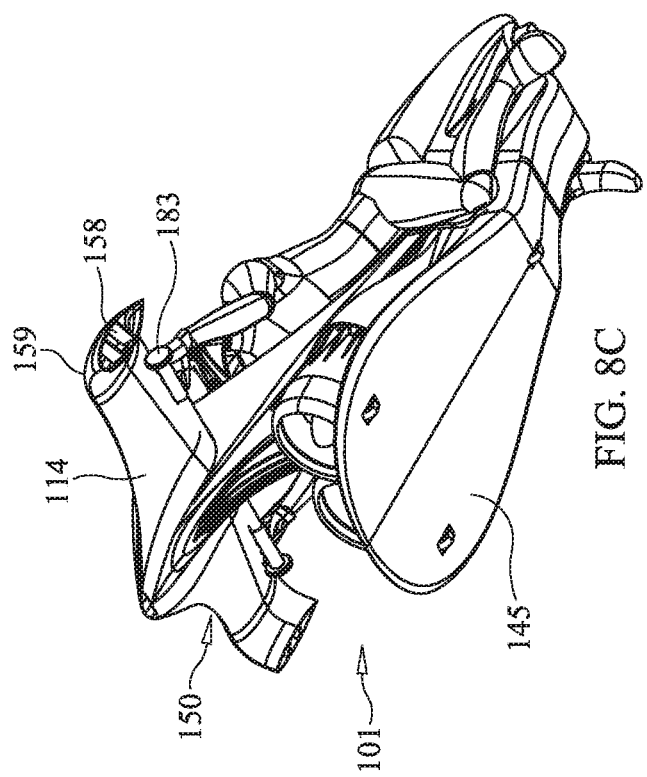
Figure 10A:
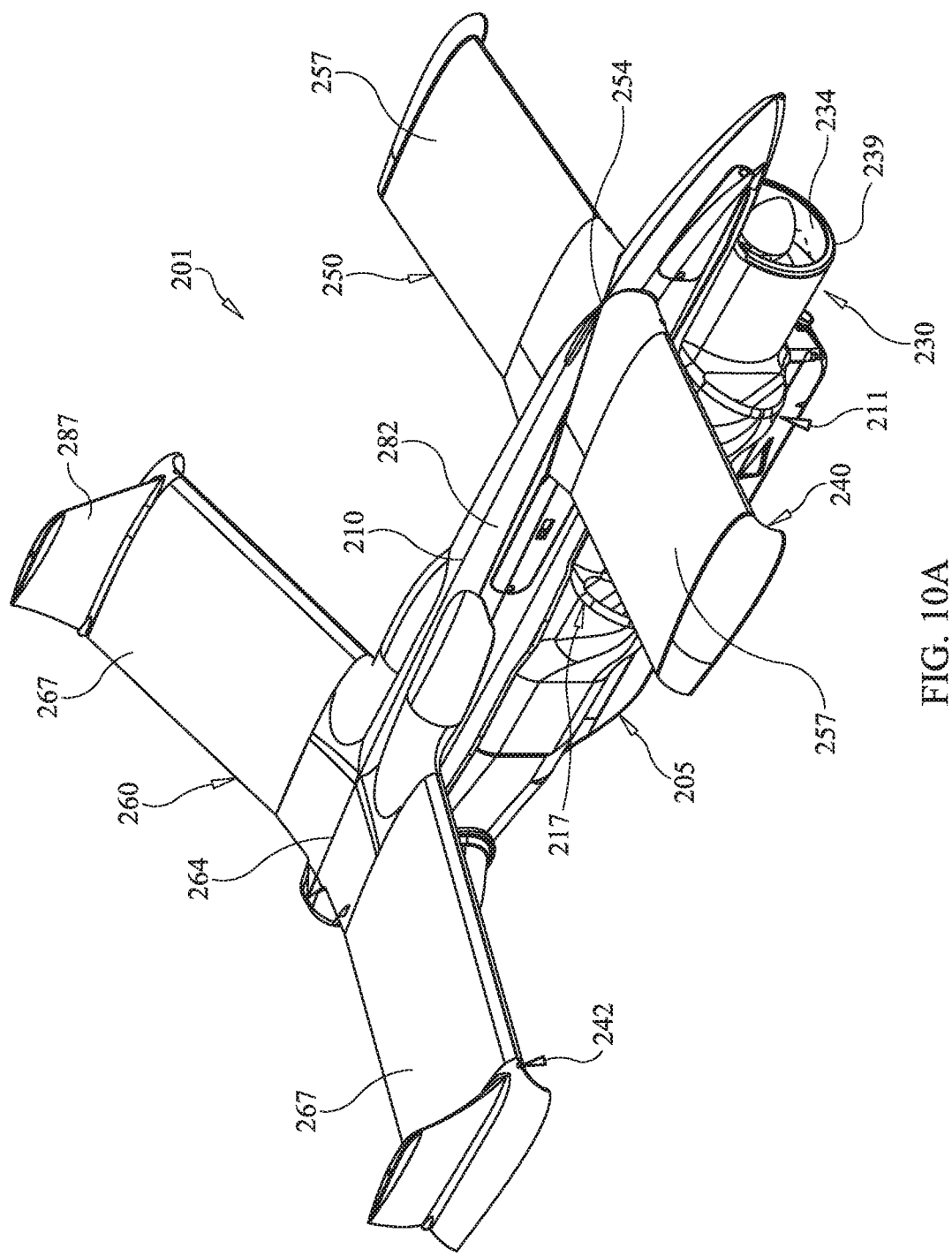
FIGS. 10A-10D illustrate, respectively, top and bottom isometric, rear, and front, views, of an aircraft, in accordance with an embodiment of the present invention.
Figure 10B:
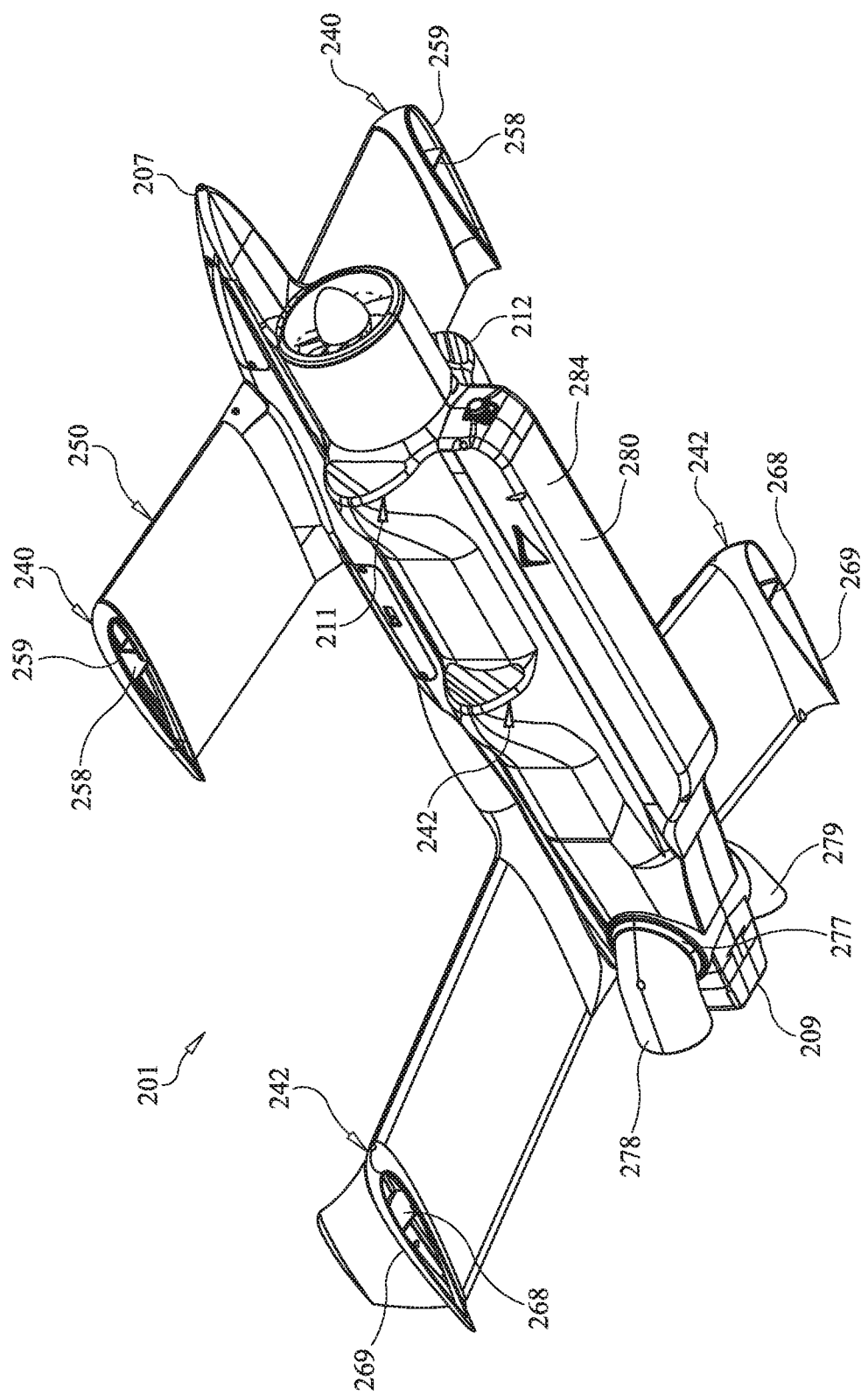
Figure 10C:
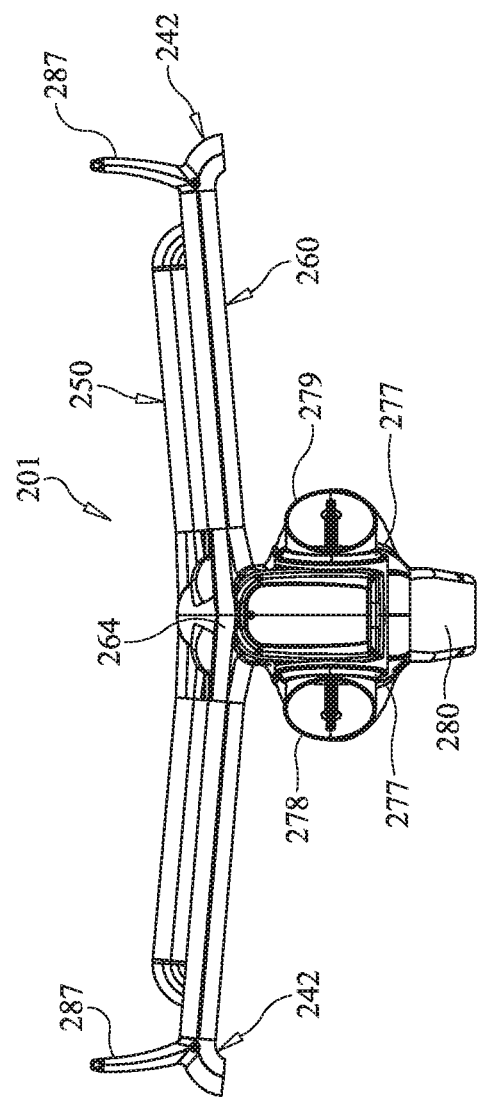
Figure 10D:
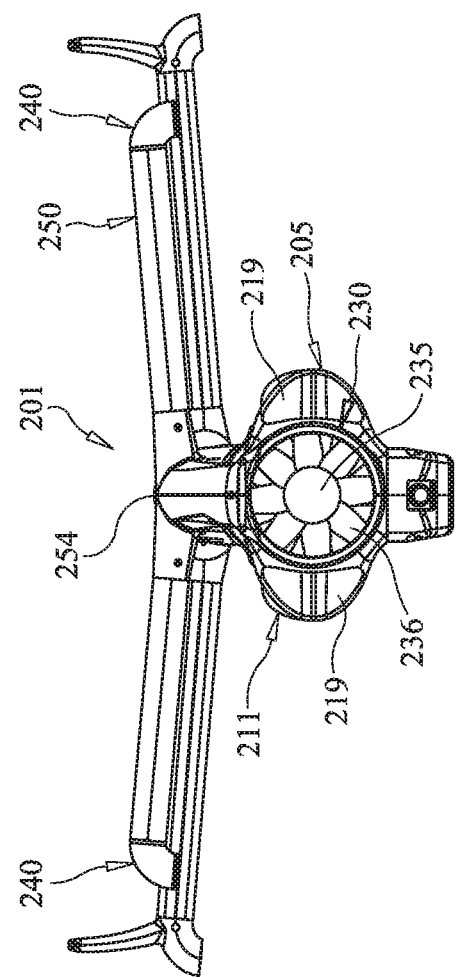
Figure 11:
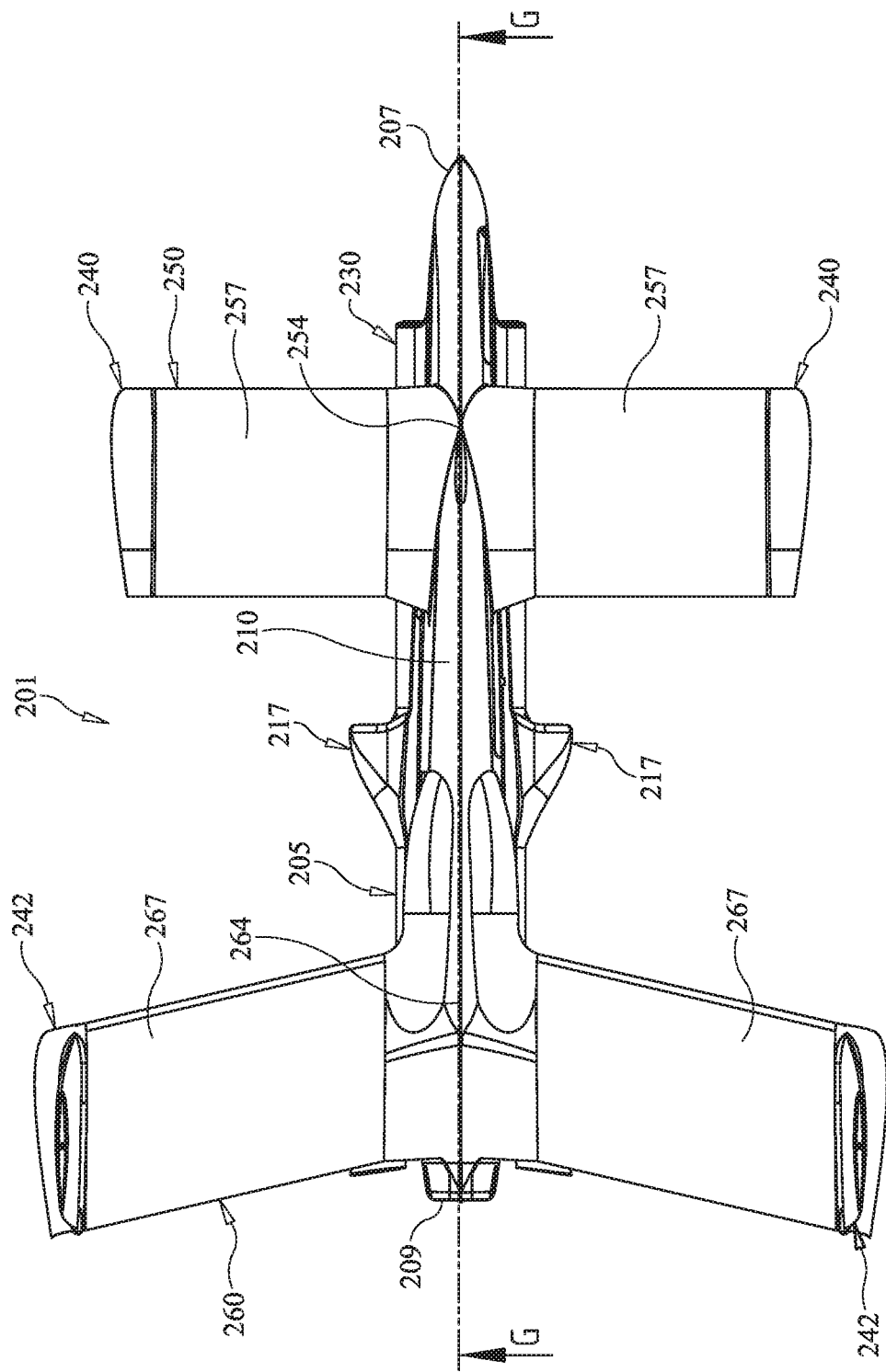
FIG. 11 illustrates a top view of an aircraft, depicting section lines G-G, in accordance with an embodiment of the present invention.
Figure 12:
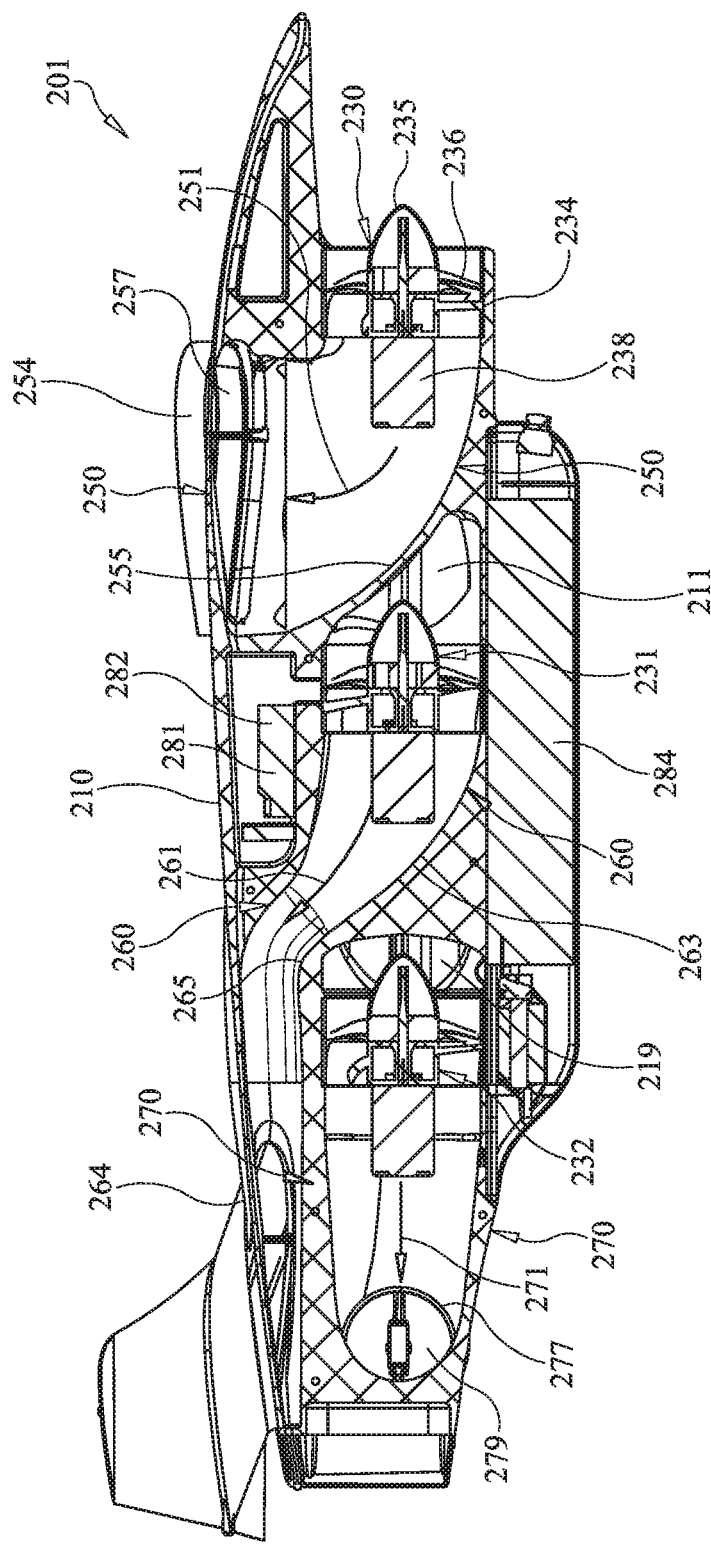
FIG. 12 illustrates a cross section of an aircraft, along section line G-G, in accordance with an embodiment of the present invention.
Figure 13:
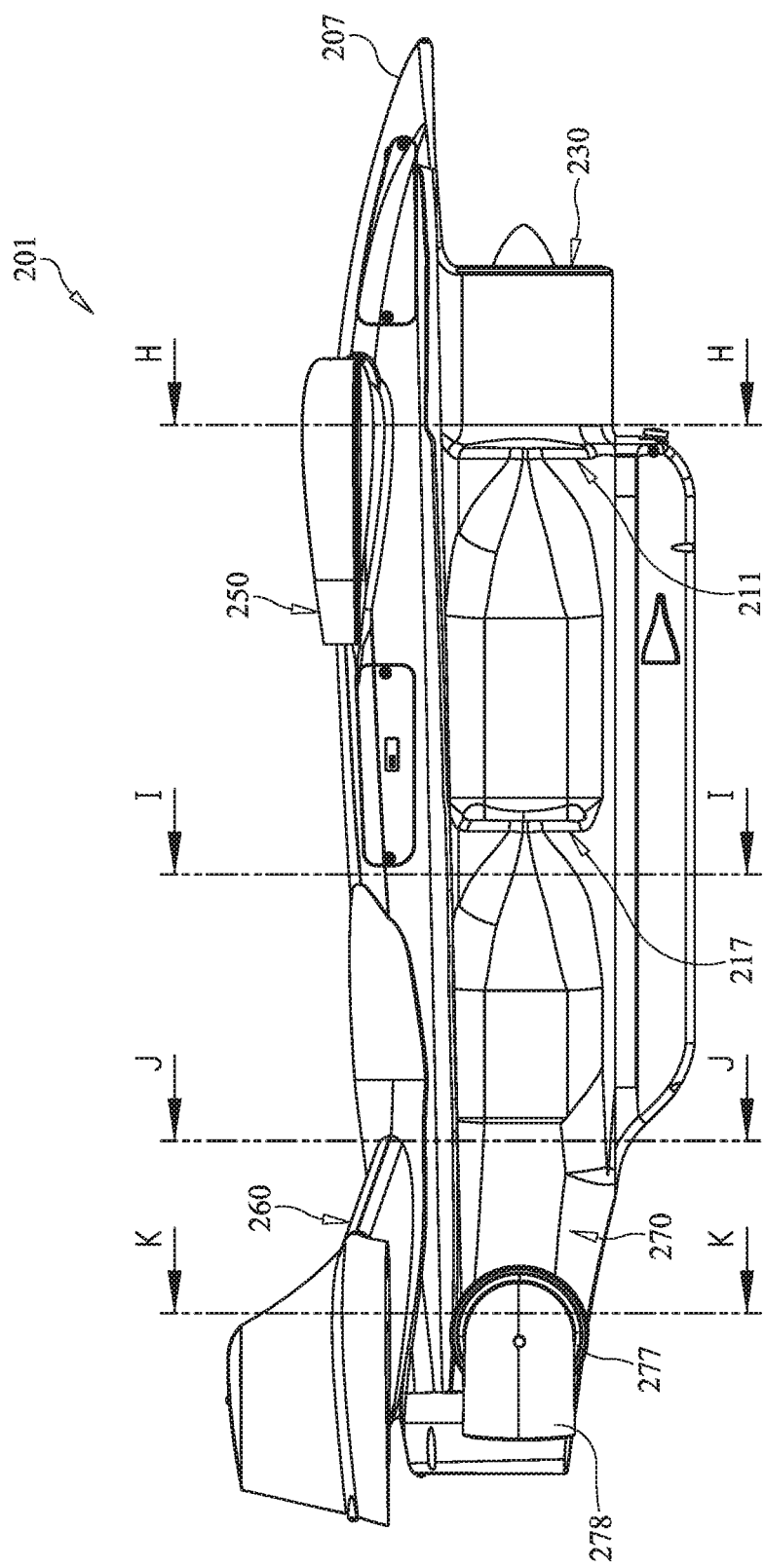
FIG. 13 illustrates a side view of an aircraft, depicting section lines H-H, I-I, J-J, and K-K, in accordance with an embodiment of the present invention.
Figure 14A:
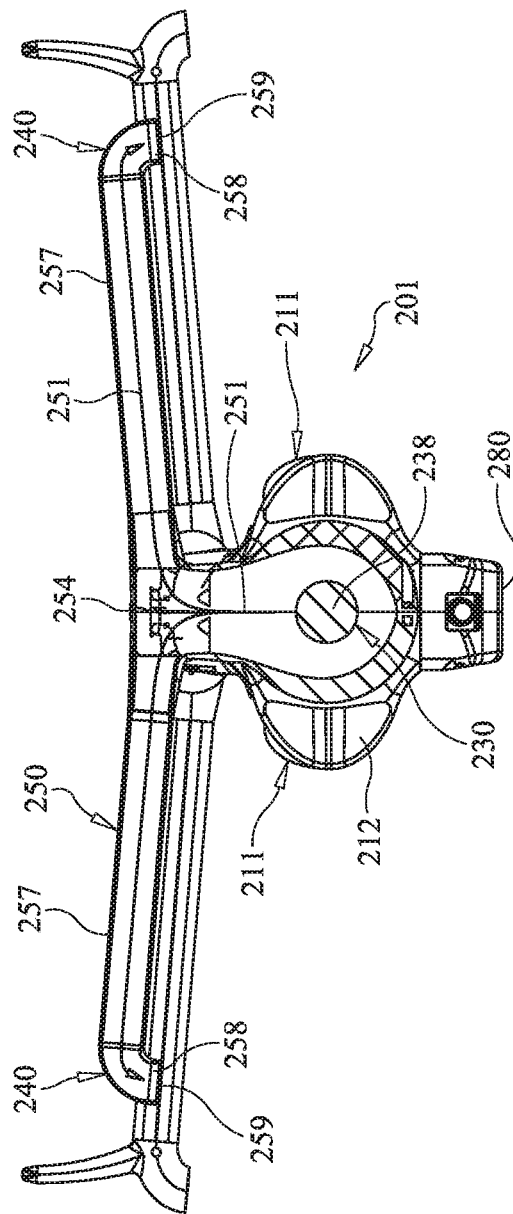
FIGS. 14A-14D illustrate cross sections of an aircraft, along section lines H-H, I-I, J-J, and K-K, in accordance with an embodiment of the present invention.
Figure 14B:
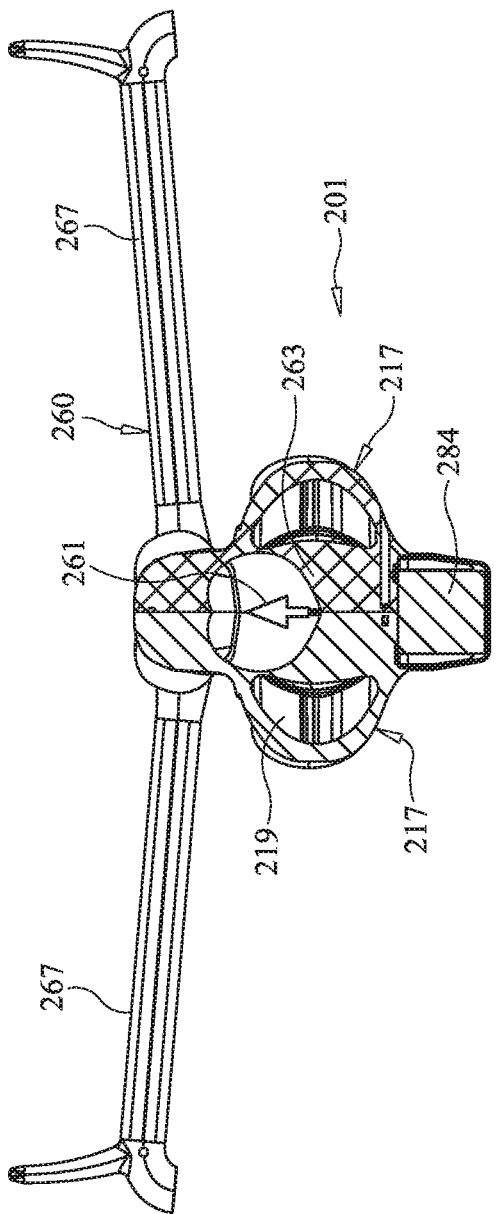
Figure 14C:
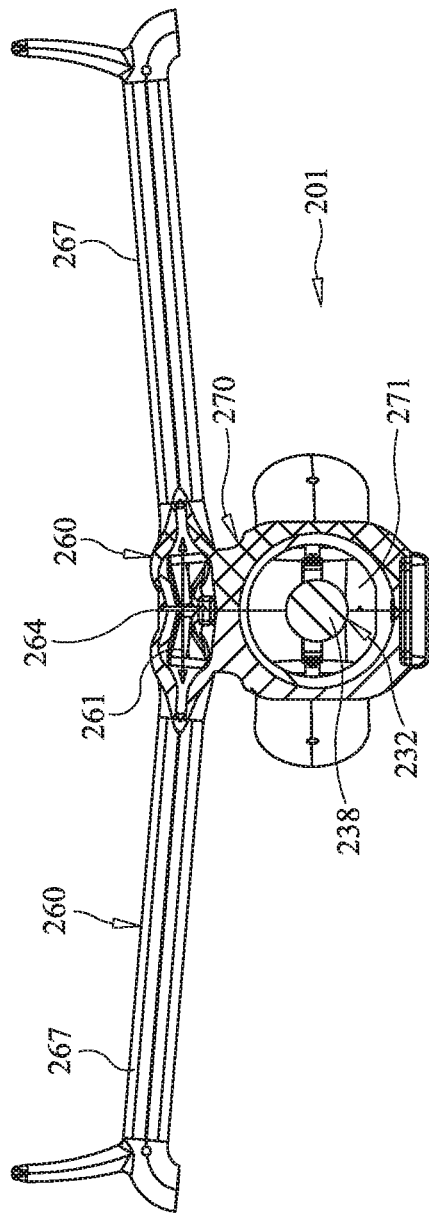
Figure 14D:
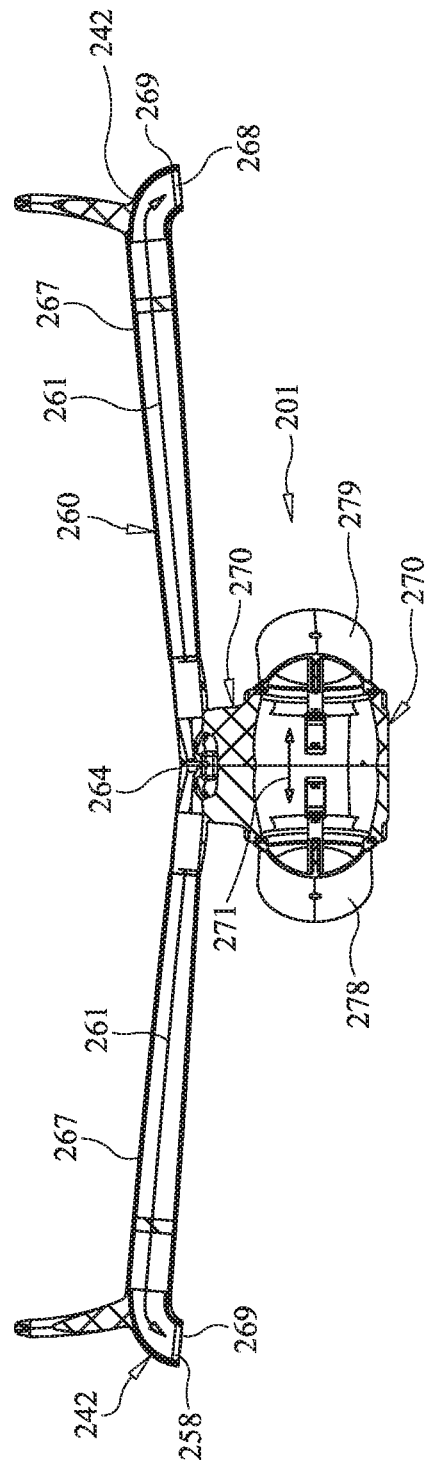
Figure 15A:
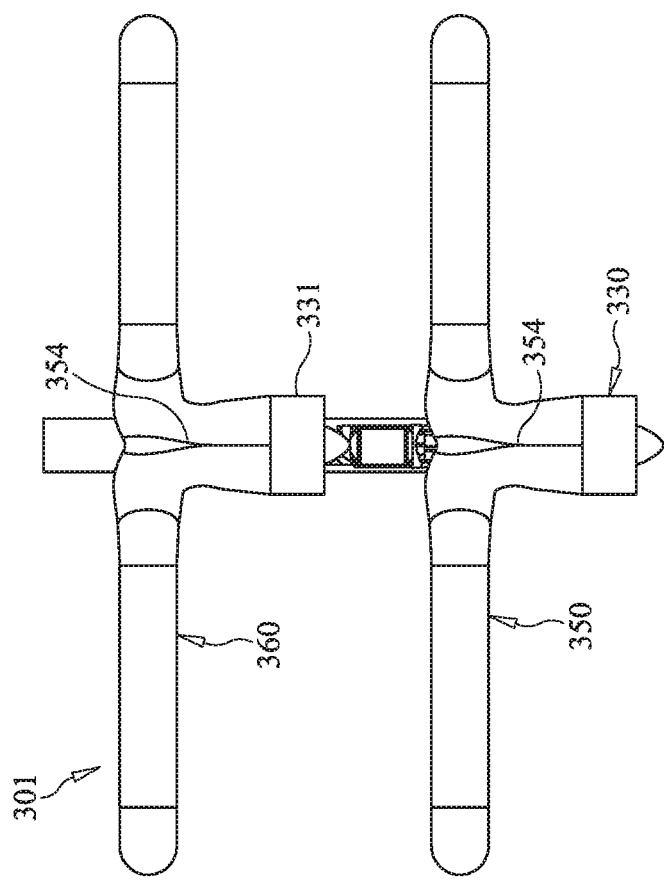
Figure 15B:
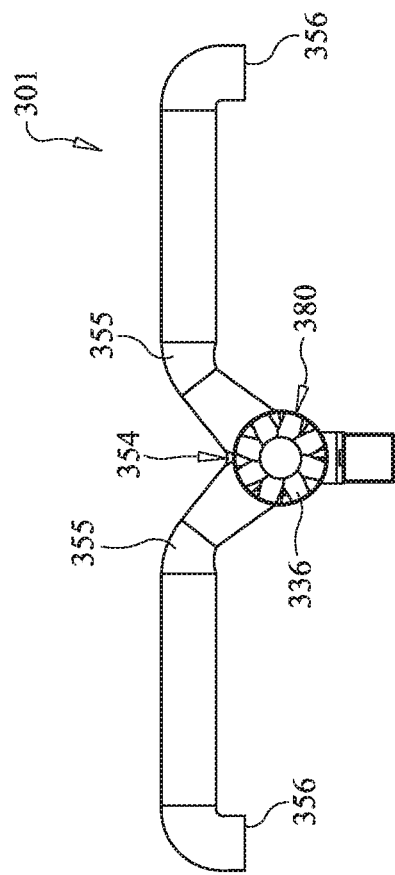

Turning to FIGS. 1, 2A, 2B, 3 & 3A, from the top, forward intake 13 is shown including forward plenum 12 and screen 13, and rear right intake 17 and rear left intake 23 are shown including rear shared rear plenum 19 and shields 21. From the bottom, forward outlets 40 (left/right) and rear outlets 42 (left/right) are visible. Outlets 40 & 42 include vanes 44 controllable by flight control system 81. Section views A-A (FIG. 2A showing main elements) and B-B (FIG. 2B showing details also present in FIG. 2A) follow, respectively, the centerlines of left forward EDF 30 and left rear EDF 31 and of right forward EDF 30 and right rear EDF 31. At forward end 7 forward plenum 12 sits just in front of forward EDFs 30 and supplies intake air thereto. At rear end 9 rear plenum 19 sits just in front of rear EDFs 31 and supplies intake air thereto. EDFs 30 and 31 include intake shroud 32, leading to fan duct 34 enclosing hub 35 supporting fan blades 36. Electric motor 38 drives hub 35 to rotate blades 36 in fan duct 34, thereby generating pressurized air traveling rearwardly from EDFs 30, 31. Forward ducts 50 are attached to the output side of each EDF 30. Forward ducts 50 include lower duct section 52, upper duct section 54, arc 55, and exit 56, forming airflow path 51. Left and right arcs 55 extend upwardly from upper face 6 of lower body 4, and spaced apart from left/right upper duct sections 54, form the curved portions of airflow paths 51 around arcs 55. (Arcs 55 and exits 56 are shown in FIGS. 5A, 5B, and arcs 55 and upper face 6 are also shown in FIG. 6.) Rear ducts 60 are attached to the output side of each EDF 31. Rear ducts 60 include lower duct section 62, upper duct section 64, arc 65, and exit 66, forming airflow path 61. Left and right arcs 65 extend upwardly from upper face 6 of lower body 4, and spaced apart from left/right upper duct sections 64, form the curved portions of airflow paths 61 around arcs 65. (Arcs 65 and exits 66 are shown in FIGS. 5C, 5D, and arcs 65 and upper face 6 are also shown in FIG. 6.) Set between forward ducts 50 and plenum 19 is compartment 80, which houses flight controls 81, transceivers 82, and batteries 84. FIGS. 7A, 7B show forward and rear plenums 12, 19 and compartment 80 with upper body 3 and lower body 4 of fuselage 5 separated from one another. Bodies 3, 4 may be removably joined using known methods, including taping, adhesives, tabs, hooks, etc.

Turning to FIGS. 2A, 2B, 5A-5D, 6, and 7A-7D, lower duct sections 52, with arcs 55, extend rearwardly and bend outwardly, and then turn upwardly around arcs 55, ending at upper face 6 of lower body 4 (except arcs 55 which extend upwardly). And lower duct sections 62, with arcs 65, extend rearwardly and bend outwardly, and then turn upwardly around arcs 65, ending at upper face 6 of lower body 4 (except arcs 65 which extend upwardly). Mating upper duct sections 54, in turn start at lower face 2 of upper body 3, continue upwardly and outwardly, and complete a turn downward (to interact with via arcs 55 to form forward airflow paths 51 that reach forward exits 56. Likewise, upper sections 64, start at lower face 2 of upper body 3, continue upwardly and outwardly, and complete a turn downward (to interact with via arcs 65 to form forward airflow paths 61 that reach rear exits 66. Thus, forward airflow paths 51 carry pressurized air in a rearward direction from EDFs 30, constrict the flow, turn it outboard left and right, and then turn it in an arcuate path to be directed downward. Likewise, rear airflow paths 61 carry pressurized air in a rearward direction from EDFs 31, constrict the flow, turn it outboard left and right, and then turn it in an arcuate path to be directed downward. Further, FIGS. 5A, 5C (section views looking aft) show motors 38 of EDFs 30, 31 in the airpath and inside lower ducting 52, 62. FIGS. 5B, 5D (section views looking forward, from aft of FIGS. 5A, 5C) also show blades 36 of EDFs 30, 31.

In accordance with an embodiment aircraft 1 may be controlled remotely via commands sent via transceivers 82 to flight control system 81. In operation, stability is maintained by independently controlling the output of left and right forward and rear EDFs 30, 31 to increase lift and/or thrust directed via forward outlets 40 (left/right) and rear outlets 42 (left/right). Outlets 40, 42 also may be controlled independently. Thus, in operation, roll may be applied by differential upward thrust left/right, such as by reducing the left EDFs 30, 31, or by adjusting left outlets 40, 42 to divert some lift to thrust (which would also create a starboard yaw). Yaw may be applied by differential forward thrust left/right, such as by reducing the left EDFs 30, 31 (if outlets 40, 42 are set in the same thrust configuration), or by adjusting left outlets 40, 42 to divert some lift to thrust and increasing the output of left EDFs 30, 31 to remain level. Pitch may be applied by differential forward thrust forward/aft, such as by increasing both rear EDFs 31, or by adjusting front outlets 40 to divert lift to thrust without increasing output of front EDFs 30.

An embodiment of the invention is illustrated in FIGS. 8A-9E and 9A-9E. In accordance with one embodiment, aircraft 101 includes fuselage 105, including forward end 107 and rear end 109, fairing 114, base 118, seat 116, flight control system 181, and handlebars 183. Fairing 114, base 118, and seat 116 are, in turn, supported by ducting 150 and 160, shown in FIGS. 9A-9E. Base 118 has a flattened surface 145 suitable for landing the aircraft, and contains batteries 184. Pilot 108 is supported on seat 116, holds handlebars 183, and operates flight control systems 181.

Front end 107 includes right forward-facing EDF 130 and left forward-facing EDF 131. EDFs 130, 131 each intake shroud 132, leading to fan duct 134 enclosing hub 135 supporting fan blades 136. Electric motor 138 (not shown) drives hub 135 to rotate blades 136 in fan duct 134, thereby generating pressurized air traveling rearwardly from EDFs 130, 131. Forward duct 150 includes adaptor 153, arc 155, divergence 154, extension 157, and left/right exits 156, forming diverging airflow path 151 (depicted here arrows preceding and following the path internal to duct 150). Right EDF 130 is attached at its output side to forward duct 150 at adaptor 153, which includes a constriction. Duct 150, following adaptor 153 extends rearwardly and, at arc 155 then bends inward to the aircraft (left/right) centerline, and then acutely upwardly and forward. Extension 157 reaches forwardly of adaptor 153 and passes through divergence 154 which splits airflow path 151 into left and right sides. Past divergence 154, extension 157 extends to left/right exits 156, which terminate in a downward-angled faired exits 159. Rear duct 160 includes adaptor 163, arc 165, extension 167, and rear exit 166, forming airflow path 161 (depicted here arrows preceding and following the path internal to duct 160). Left EDF 131 is attached at its output side to rear duct 160 at adaptor 163, which includes a constriction. Duct 160, following adaptor 163 extends rearwardly and, at arc 165 then bends down and inward to the aircraft (left/right) centerline, and then arcs upwardly to higher than adaptor 163. Extension 167 continues to reach rearwardly and upwardly, and connects to rear exit 166.

Forward outlets 140 (left/right) extend at the lateral ends of fairing 114 and connect to left and right faired exits 159 forward duct 150, which connect to left and right exits 156. Outlets 140 include vanes 158 controllable by flight control system 181. Rear outlet 142 extends rearward from exit 166 of rear duct 160. Rear outlet 142 includes gimbaled vectoring device 168, controllable by flight control system 181, which is provided an open operational space by rear 109 so that thrust exiting from vectoring device 168 can provide desired thrust to aircraft 101. Thus, forward airflow path 151 carries pressurized air in a rearward direction from EDF 130, constricts the flow, carries it forward and up, splits it outboard left and right, and then directs it partially downward, to be controlled by vanes. Likewise, rear airflow path 161 carries pressurized air in a rearward direction from EDF 131, constricts the flow, carries it rearward and slightly up, then directs it to be controlled by the vectoring device.

In accordance with an embodiment aircraft 101 may be controlled by pilot 8 via handlebars 183 and flight control system 181. In operation, stability is maintained by independently controlling the output of left and right EDFs 130, 131 to increase lift and/or thrust directed via forward outlets 140 (left/right) and rear outlet 142. Outlets 140, 142 also may be controlled independently. Thus, in operation, roll may be applied by lateral thrust left/right, such as by turning gimbaled vectoring device 168 to starboard or port (the opposite side) including with an upward or downward angle, or by differential lift left/right created by adjusting left outlet 140 to divert some lift to thrust (which would also create a starboard yaw). Yaw may be applied, such as by turning gimbaled vectoring device 168 to starboard or port (the opposite side), or by differential forward thrust left/right, such as by adjusting left outlet 140 to divert some lift to thrust (which may also cause roll). Pitch may be applied by differential forward thrust forward/aft, such as by decreasing increasing right EDF 130, by adjusting front outlets 40 to divert lift to thrust, or by turning gimbaled vectoring device 168 to point downward.

An embodiment of the invention is illustrated in FIGS. 10A-10D, 11-13, and 14A-14D. In accordance with one embodiment, aircraft 201 includes fuselage 205, formed in part of forward ducting 250, rear ducting 260, and thrust ducting 270, including forward end 207 and rear end 209, top compartment 210 with flight control system 281 and transceivers 282, and bottom compartment 280 with batteries 284. Top compartment 210, bottom compartment 280, flight control system 281, and transceivers 282, and batteries 284, are supported by ducting 250, 260, and 270 (see FIG. 12).

Aircraft 201 includes three independent forward-facing EDFs and their associated ducting, with the EDFs set in-line along the longitudinal axis of aircraft 201. Forward EDF 230, rear EDF 231, and thrust EDF 232 each include fan duct 234 enclosing hub 235 supporting fan blades 236 and have electric motor 238 to drive hub 235 to rotate blades 236 in fan duct 234, thereby generating pressurized air traveling rearwardly from EDFs 230, 231, and 232.

Forward EDF 230 also includes intake shroud 232, and near front end 207, and accepts intake air there. The output end of EDF 230 is connected to forward ducting 250. Forward ducting 250 includes arc 255, divergence 254, left and right forward airfoils 257, and left/right downward-angled faired exits 259, and controllable vanes 258, forming diverging airflow path 251. Forward EDF 230 is attached at its output side to forward ducting 250 at an inlet end, then promptly turns rearwardly and upwardly at arc 255 direct the airflow substantially upwardly. Around arc 255, ducting 250 lengthens longitudinally and constricts laterally. At divergence 254, ducting 250 splits airflow path 251 into left and right sides. Past divergence 254, airfoils 257 extend to left/right, extending to downward-angled faired exits 259 and forward outlets 240. Airflow path 251 then passes downward via exits 259 past vanes 258.

Rear EDF 231 is connected to left & right side-mounted intakes 211, which are aft of forward EDF 230, and accept intake air into converging chamber 212, which supplies air to EDF 231. The output end of rear EDF 231 is connected to rear ducting 260. Rear ducting 260 includes arc 265, constriction 263, divergence 264, left and right rear airfoils 267, and left/right downward-angled faired exits 269, and controllable vanes 268, forming, with intakes 211 and converging chamber 212, a converging and diverging airflow path 261. Rear EDF 231 is attached at its output side to rear ducting 260 at an inlet end, then passes through constriction 264 and bends upwardly and then rearwardly at arc 265 to direct the airflow substantially upwardly. At a distance rearwardly of arc 265, ducting 260 enters divergence 264, where ducting 260 splits laterally to split airflow path 261 into left and right sides. Past divergence 264, airfoils 277 extend to left/right, extending to downward-angled faired exits 269 and rear outlets 242. Airflow path 261 then passes downward via exits 256 and vanes 258. Airfoils 277 also include upward-extending winglets 287 at their ends.

Thrust EDF 232 is connected to left & right side-mounted intakes 217, which are aft of forward EDF 230, and accept intake air into converging chamber 219, which supplies air to EDF 232. The output end of thrust EDF 232 is connected to thrust ducting 270. Thrust ducting 270 includes left and right thrust vector tubes 278 and 279, mounted on the sides of thrust ducting 270, and forming, with intakes 217 and converging chamber 219, a converging and diverging airflow path 271. Tubes 278, 279 are connected to thrust ducting 270 by controllable, rotatable joints 277, which are controllable by flight control system 281. Tubes 278, 279 and are formed substantially as right angles to redirect thrust at an angle to joints 277. Airflow path 271 thus passes into tubes 278, 279 and outward in the direction in which the respective tubes are directed.

Thus, forward airflow path 251 carries pressurized air in a rearward direction from EDF 230, constricts the flow, carries it rearward and up, splits it outboard left and right, and then directs it downward. Rear airflow path 261 constricts the flow, carries the pressurized air in a rearward and up direction from EDF 231, splits it outboard left and right, and then directs it downward. And thrust airflow path 271 carries pressurized air rearward direction from EDF 232, carries it outboard to controllable side-mounted vector control devices.

In accordance with an embodiment aircraft 201 may be controlled remotely via commands sent via transceivers 282 to flight control system 281. In operation, stability is maintained by independently controlling the output of forward and rear EDFs 230, 231, and thrust EDF 232, to increase lift and/or thrust directed via forward outlets 240 (left/right) and rear outlets 242 (left/right), and via vector tubes 278 and 279. Outlets 240, 242 and tubes 278, 279 also may be controlled independently. Thus, in operation, roll may be applied by differential upward thrust left/right, such as by adjusting left outlets 240, 242 to divert some lift to thrust (which would also create a starboard yaw), or by directing thrust upward from starboard tube 278 and downward from port tube 279. Yaw may be applied by differential forward thrust left/right, such as by adjusting left outlets 240, 242 to divert some lift to thrust (which would tend to induce a port roll). Pitch may be applied by differential forward thrust forward/aft, such as by increasing rear EDF 231, by adjusting front outlets 240 to divert lift to thrust without increasing output of forward EDF 230, or by directing thrust downward from tubes 278, 279.

An embodiment of the invention is illustrated in FIGS. 15A-15D. In accordance with one embodiment, aircraft 301 includes forward ducts 350 and rear ducts 360 and connecting frame 315 therebetween. Supported on frame 315 are flight controls 381, transceivers 382, and batteries 384. Forward EDF 330 and rear EDF 331 supply air to, respectively, forward ducts 350 and rear ducts 360. EDFs 330 and 331 each include intake shroud 332, leading to fan duct 334 enclosing hub 335 supporting fan blades 336. Electric motor 338 (not shown) drives hub 335 to rotate blades 336 in fan duct 334, thereby generating pressurized air traveling rearwardly from EDFs 330, 331. Forward duct 350 is attached to the output side of EDF 330. Forward duct 350 includes split 355, arcs 355, arms 357, and exits 356, forming a forward airflow path. Rear duct 360 is attached to the output side of EDF 331. Rear duct 360 includes split 365, arcs 365, arms 367, and exits 366, forming a rear airflow path. Outlets 340, 342 exhaust downward through, respectively, exits 356, 366, to provide lift to aircraft 301. Ducts 350, 360 thus lift aircraft 301, including the load supported by frame 315, and thus are fully loadbearing. Outlets 340, 342 could also include vanes (not shown) controllable by flight control system 381 to supply forward and rearward thrust. Each of ducts 350, 360 extends rearwardly through splitters 354, 364, and then narrow as splitter divides the flow into port/starboard flow, turning upwardly and outboard higher than EDFs 330, 331. Ducts 350, 360 then turn laterally outboard at arcs 355, 365 to extend further outward via port and starboard extensions 357, 367. Ducts 350, 360 then turn downward forward exits 356, 366. Thus, the forward airflow paths and rear airflow paths carry pressurized air in a rearward direction from each EDFs 330, 331, turn it upward and outboard port and starboard, and turn in outwardly, then turn it in an arcuate path to be directed downward.

In accordance with an embodiment aircraft 301 may be controlled remotely via commands sent via transceivers 382 to flight control system 381. In operation, stability is maintained by independently controlling the output of forward and rear EDFs 330, 331, to increase lift and/or thrust directed via forward outlets 340 (left/right) and rear outlets 342 (left/right). Thus, in operation, pitch may be controlled by differential forward thrust forward/aft, such as by increasing rear EDF 331. If controllable vanes are provided, roll and yaw may be applied in the fashion described above.

Figure 16A:
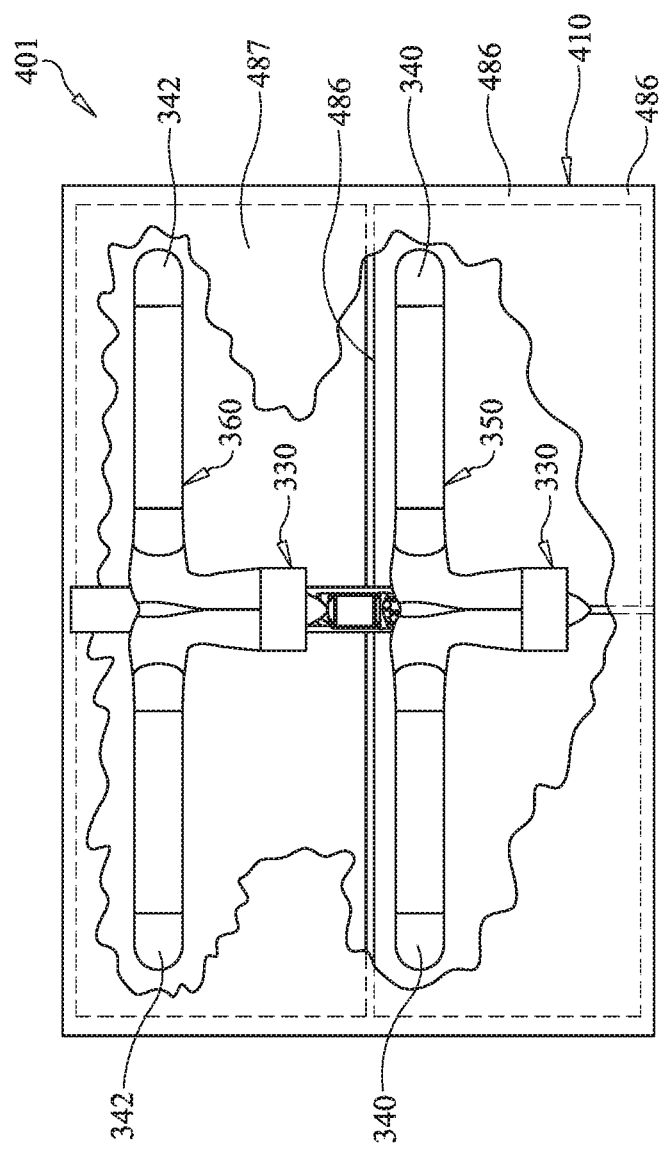

An embodiment of the invention is illustrated in FIGS. 16A-16C. In accordance with one embodiment, aircraft 401 is a modified aircraft 301, in which references for aircraft 301 are carried forward. As with aircraft 301, aircraft 401 includes forward ducts 350 and rear ducts 360 and connecting frame 315 therebetween. Supported on frame 315 are flight controls 381, transceivers 382, and batteries 384. Forward EDF 330 and rear EDF 331 supply air to, respectively, forward ducts 350 and rear ducts 360. Other details similar to those shown for aircraft 301 are omitted. In aircraft 401, frame 415 has been extended forward and around the periphery of the aircraft to form a rectangular base. Framework 486 extends upward from frame 415 to form the skeleton of a structure 410, which is covered over by material 487. Hanging down from frame 415 is fringe 488 to hide parts of aircraft 410 below frame 415. In this manner, an aircraft includes large surfaces that could be used to present advertisement, display decorations, such as on a float, or with a suitable framework depict a character.

The invention claimed is:

1. An aircraft, in an environment in which lift and thrust are supplied thereby and the aircraft experiences static and dynamic loading in flight, comprising:
   at least one source of pressurized gas;
   an airframe supporting static and dynamic loading experienced by the aircraft;
   the airframe comprising ducting;
      said ducting connected to the at least one source and forming a flowpath for the pressurized gas;
      said ducting supporting airframe loading;
   said airframe comprising a fuselage; and
   said ducting being integrally formed in the fuselage.

2. The aircraft of claim 1, further comprising:
   said ducting forming a substantial portion of the fuselage.

3. The aircraft of claim 2, further comprising:
   said airframe comprising one or more airfoils capable of providing lift to the aircraft; and
   said ducting forming substantially all of said one or more airfoils.

4. The aircraft of claim 2, further comprising:
   said fuselage having an exterior surface; and
   said ducting comprising an exit therefrom;
      said exit located at least closely adjacent to the exterior surface.

5. The aircraft of claim 4, further comprising:
   the fuselage having a longitudinal length; and
   said ducting defining a path between the source and the exit and extending along that path a length at least about one-fourth of the longitudinal length of the fuselage.

6. The aircraft of claim 1, further comprising:
   said at least one source of pressurized gas comprising at least two electric ducted fans; and
   said ducting comprising at least two ducts;
      each of said ducts connected to one each of said fans;
      said ducting comprising at least one exit each therefrom.

7. The aircraft of claim 1, further comprising:
   said ducting comprising at least two tips and at least one divergence in the flowpath;
      said tips being on opposing sides of said divergence;
      said ducting comprising at least one exit located at least closely adjacent to each of said tips.

8. The aircraft of claim 1, further comprising:
   said airframe comprising one or more airfoils capable of providing lift to the aircraft; and
   said ducting forming substantially all of said one or more airfoils.

9. The aircraft of claim 1, further comprising:
   said ducting supporting substantially all of the airframe loading in flight.

10. The aircraft of claim 1, further comprising:
    said ducting formed of joined parts.

11. The aircraft of claim 1, further comprising:
said ducting formed of supporting material surrounding said flowpath; and
said supporting material selected from the group consisting of plastic, metal, a foamed material, and expanded foam.

12. The aircraft of claim 8, further comprising:
a center of gravity;
each of said one or more airfoils comprising a root proximate to the center of gravity and a tip distal therefrom; and
said ducting comprising at least one exit therefrom;
said at least one exit located at least closely adjacent to the tip.

13. The aircraft of claim 8, further comprising:
a first and a second source of pressurized gas;
said ducting comprising a first duct connected to the first source and a second duct connected to the second source; and
said airframe comprising at least two sets of airfoils each extending from the aircraft;
the first duct forming substantially all of the first set of airfoils; and
the second duct forming substantially all of the second set of airfoils.

14. The aircraft of claim 8, further comprising:
said ducting supporting substantially all of the airframe loading in flight.

15. The aircraft of claim 9, further comprising:
said aircraft not requiring airfoils providing lift for flight.

16. The aircraft of claim 9, further comprising:
four sources of pressurized gas;
said ducting comprising four ducts; and
each of said ducts connected to one each of said sources;
each of said ducts comprising at least one exit therefrom.

17. A method of providing lift to an aircraft having an airframe, comprising:
providing a pressurized gas for lifting the aircraft;
transmitting the pressurized gas inside ducting forming part of the airframe;
providing lift to the aircraft by propelling the pressurized gas downward from exits on said ducting; and
supporting aircraft weight on the ducting;
said airframe comprising a fuselage; and
said ducting being integrally formed in the fuselage.

18. The method of claim 17, further comprising:
said ducting forming a substantial portion of the fuselage.

19. The method of claim 17, further comprising:
providing variable thrust to the aircraft by operating a thrust vectoring device to propel part of the pressurized gas from said exits at an angle to downward.

20. The method of claim 17, further comprising:
creating lift for the aircraft by one or more airfoils; and
said ducting forming substantially all of said one or more airfoils.

21. The method of claim 17, further comprising:
said providing pressurized gas step comprising operating a first and a second source of pressurized gas;
said ducting comprising a first duct connected to the first source and a second duct connected to the second source; and
said airframe further comprising at least two sets of airfoils each extending from the aircraft;
the first duct forming substantially all of the first set of airfoils; and
the second duct forming substantially all of the second set of airfoils.

22. The method of claim 17, further comprising:
said supporting step comprising supporting substantially all of the aircraft weight on said ducting in flight.

23. The method of claim 18, further comprising:
creating lift for the aircraft by one or more airfoils; and
said ducting forming substantially all of said one or more airfoils.

24. The method of claim 18, further comprising:
the fuselage having a longitudinal length; and
said transmitting step comprising transmitting the pressurized gas inside ducting for a length at least about one-fourth of the longitudinal length.

25. The method of claim 20, further comprising:
said providing pressurized gas step comprising operating a first and a second source of pressurized gas;
said ducting comprising a first duct connected to the first source and a second duct connected to the second source; and
said airframe further comprising at least two sets of airfoils each extending from the aircraft;
the first duct forming substantially all of the first set of airfoils; and
the second duct forming substantially all of the second set of airfoils.

26. The method of claim 20, further comprising:
said transmitting step comprising transmitting the pressurized gas inside said one or more airfoils.

27. The method of claim 20, further comprising:
said supporting step comprising supporting substantially all of the aircraft weight on said ducting in flight.

28. The method of claim 22, further comprising:
said providing step providing substantially all lift to the aircraft for flight.

* * * * *